United States Patent
Liu et al.

(10) Patent No.: US 11,499,014 B2
(45) Date of Patent: Nov. 15, 2022

(54) CUREABLE FORMULATIONS FOR FORMING LOW-K DIELECTRIC SILICON-CONTAINING FILMS USING POLYCARBOSILAZANE

(71) Applicants: L'Air Liquide, Société Anonyme pour l'Etude et l'Exploitation des Procédés Georges Claude, Paris (FR); American Air Liquide, Inc., Fremont, CA (US)

(72) Inventors: Yumin Liu, San Jose, CA (US); Jean-Marc Girard, Versailles (FR); Peng Zhang, Montvale, NJ (US); Fan Qin, Bear, DE (US); Gennadiy Itov, Flemington, NJ (US); Fabrizio Marchegiani, Wilmington, DE (US); Thomas J. Larrabee, Middletown, DE (US)

(73) Assignees: L'Air Liquide, Société Anonyme pour l'Etude et l'Exploitation des Procédés Georges Claude, Paris (FR); American Air Liquide, Inc., Fremont, CA (US)

(*) Notice: Subject to any disclaimer, the term of this patent is extended or adjusted under 35 U.S.C. 154(b) by 39 days.

(21) Appl. No.: 16/731,728

(22) Filed: Dec. 31, 2019

(65) Prior Publication Data
US 2021/0198429 A1    Jul. 1, 2021

(51) Int. Cl.
| | | |
|---|---|---|
| C08G 77/12 | (2006.01) | |
| B05D 1/00 | (2006.01) | |
| B05D 3/02 | (2006.01) | |
| C08G 77/26 | (2006.01) | |
| C08G 77/08 | (2006.01) | |

(52) U.S. Cl.
CPC ............ *C08G 77/12* (2013.01); *B05D 1/005* (2013.01); *B05D 3/0209* (2013.01); *B05D 3/0263* (2013.01); *C08G 77/08* (2013.01); *C08G 77/26* (2013.01); *B05D 2518/12* (2013.01)

(58) Field of Classification Search
CPC ........... C08G 77/60; C08K 5/544; C07F 7/10; B05D 2518/12
See application file for complete search history.

(56) References Cited

U.S. PATENT DOCUMENTS

| | | |
|---|---|---|
| 5,260,377 A | 11/1993 | Weber et al. |
| 8,441,006 B2 | 5/2013 | Michalak et al. |
| 9,243,324 B2 | 1/2016 | Bowen et al. |
| 2004/0018750 A1* | 1/2004 | Sophie .............. H01L 21/76807 438/634 |
| 2009/0026924 A1 | 1/2009 | Leung et al. |
| 2009/0305063 A1 | 12/2009 | Hayashi |
| 2012/0161295 A1 | 6/2012 | Michalak et al. |
| 2013/0075876 A1 | 3/2013 | Goethals et al. |
| 2014/0004358 A1 | 1/2014 | Blackwell et al. |
| 2015/0087139 A1 | 3/2015 | O'Neill et al. |
| 2018/0087150 A1* | 3/2018 | Kerrigan ............... C23C 16/345 |
| 2018/0208796 A1 | 7/2018 | Pandey et al. |
| 2019/0055645 A1 | 1/2019 | Li et al. |
| 2019/0040279 A1 | 2/2019 | Khandelwal et al. |
| 2019/0189432 A1 | 6/2019 | Nakatani |

FOREIGN PATENT DOCUMENTS

| | | |
|---|---|---|
| JP | 2005 220261 | 8/2005 |
| WO | WO 2016 049154 | 3/2016 |
| WO | WO 2016 160991 | 10/2016 |

OTHER PUBLICATIONS

International Search Report and Written Opinion for corresponding PCT/US2020/067194, dated Mar. 30, 2021.
University of Louisville Micro/Nano Technology Center, Spin coating theory, Oct. 2013, 4 pages.

\* cited by examiner

*Primary Examiner* — Kuo Liang Peng
(74) *Attorney, Agent, or Firm* — Yan Jiang

(57) ABSTRACT

Disclosed are silicon and carbon containing film forming compositions comprising a polycarbosilazane polymer or oligomer formulation that consists of silazane-bridged carbosilane monomers, the carbosilane containing at least two —$SiH_2$— moieties, either as terminal groups (—$SiH_3R$) or embedded in a carbosilane cyclic compound, wherein R is H, a $C_1$-$C_6$ linear, branched, or cyclic alkyl- group, a $C_1$-$C_6$ linear, branched, or cyclic alkenyl- group, or combination thereof. Also disclosed are methods of forming a silicon and carbon containing film comprising forming a solution comprising a polycarbosilazane polymer or oligomer formulation and contacting the solution with the substrate via a spin-on coating, spray coating, dip coating, or slit coating technique to form the silicon and carbon containing film.

20 Claims, 6 Drawing Sheets

CUREABLE FORMULATIONS FOR FORMING LOW-K DIELECTRIC SILICON-CONTAINING FILMS USING POLYCARBOSILAZANE

TECHNICAL FIELD

The present invention relates to processes of deposition of a low-k dielectric silicon and carbon containing film on a substrate by wet coating, preferably spin-on deposition (SOD) using a silicon and carbon containing film forming composition comprising a polycarbosilazane polymer or oligomer containing formulation, followed by a curing step and a hardbaking step.

BACKGROUND

Spin-on coating is a procedure used to deposit uniform thin films onto mainly flat substrates by centrifugal force. In general, a coating formulation is applied on the center of the substrate, which is then spun at a certain speed. The coating formulation is spread by centrifugal force and forms a film to cover the substrate. The thickness of the film is typically controlled by the concentration of the coating formulation and the spin rate. In order to make the coating material flowable, a volatile solvent is used. The volatile solvent may be evaporated off as the film is formed. The thickness of the film depends on the angular speed of spinning, the viscosity and concentration of the solution, and the solvent. Spin-on coating is widely used in micro-electronics fabrication to make a variety of films such as photo-resists, anti-reflective coatings, low-k dielectric films, silicon oxide films, etc. In some applications, the spin-on dielectrics formed by a spin-on coating process are able to insulate transistors or conductive layers. The increase in semiconductor design integration by feature size reduction has resulted in the back end of line manufacturing (BEOL) in increased levels of interconnected metal lines and vertical vias, insulated from each other by thin dielectric layers. Dielectric layers having a low dielectric constant (low-k) are sought for such thin dielectric layers as they limit electromagnetic cross talks between the metal lines. At the transistor manufacturing level (Front End of Line), several steps in device manufacturing require the usage of dielectric films having the capability to deposit into deep trenches and holes. For instance, shallow trench isolation and fin isolation require the deposition of dielectric films in the bottom of trenches. Similarly, to the BEOL application, there is also a growing need to fill such features with insulating films having a lower dielectric constant than $SiO_2$. Compared to the BEOL low-k films, Front End of Line additional constraints are the requirements of a high gap filling capability, and for the deposited film to withstand the high temperatures that are required when building the rest of the chip, i.e. typically >400° C., and more preferably >500° C., without significant impact on the film physical and chemical properties (dimension, stress, dielectric constant, chemical bonding, etc.). The Semiconductor industry has developed several low-k materials that are inorganic, organic or hybrid materials to replace silicon dioxide. These materials may be deposited by either chemical vapor deposition (CVD) or spin-on deposition (SOD) processes. Materials such as polyimide, carbon-doped silicon oxides and polyarylene may be deposited using SOD techniques.

US 2019/0040279 to Khandelwal et al. discloses process and formulation for Polycarbosilazane containing formulations comprising precursors having a unit having the formula: $[—NR—R^4R^5Si—(CH_2)_t—SiR^2R^3-]_n$, where n=2 to 400; R is H; $R^2$, $R^3$, $R^4$, $R^5$ are independently H, a hydrocarbon group, or an alkylamino group, and provided that at least one of $R^2$, $R^3$, $R^4$ and $R^5$ is H.

US 2015/0087139 to O'Neil et al. discloses precursors and method for forming Si-containing films using organoaminosilane precursors, for example, $H_3Si(CH_2)_nSiH_2NR—C(Me)=NR$.

WO 2016/160991 to Kerrigan et al. discloses Si-containing film forming composition that comprise of Si—N containing precursors and methods for synthesizing these precursors by catalytic dehydrogenative coupling of carbosilanes with ammonia, amines, and amidine.

U.S. Pat. No. 5,260,377 to Leibfried et al. discloses crosslinkable carbosilane polymer formulation prepared from saturated or unsaturated carbosilane polymers containing reactive silicon hydride radicals in the polymer chain combined with polycyclic polyene crosslinkers that have two or more double bonds reactive in a hydrosilylation crosslinking reaction.

U.S. Pat. No. 9,243,324 to Bowen et al. discloses the methods for forming non-oxygen containing Si-based films that contain >50 atomic % of silicon. In one embodiment, the non-oxygen containing Si-based films were deposited using at least one organosilicon precursor having at least two —$SiH_3$ groups with at least one $C_{2-3}$ linkage between silicon atoms such as 1,4-disilabutane.

US Patent Application 2019/0055645 to Li et al. discloses Si-containing film forming composition that include a first compound having carbon-carbon double bond or carbon-carbon triple bond and a second compound comprising at least one Si—H bond.

US Patent Application 2009/0026924 Leung et al. discloses a method for forming a substantially transparent nanoporous organosilicate film on a substantially transparent substrate, for use in optical lighting devices such as organic light emitting diodes (OLEDs). The method includes first preparing a composition comprising a silicon containing pre-polymer, a porogen, and a catalyst. The composition is coated onto a substrate which is substantially transparent to visible light, forming a film thereon. The film is then gelled by crosslinking and cured by heating, such that the resulting cured film is substantially transparent to visible light.

US Patent Application 2013/0075876 to Goethals et al. discloses a method for at least partially sealing a porous material which comprised forming a sealing layer onto the porous material by applying a sealing compound comprising oligomers wherein the oligomers are formed by ageing a precursor solution comprising cyclic carbon bridged organosilica and/or bridged organosilanes. The method is especially designed for low k dielectric porous materials to be incorporated into semiconductor devices.

U.S. Pat. No. 8,441,006 to Michalak et al. discloses dielectric films and low-k dielectric films and methods for making dielectric and low-k dielectric films. Dielectric films are made from carbosilane-containing precursors.

US Patent Application 2018/0208796 to Pandey et al. discloses a composition for planarizing a semiconductor device surface including poly(methyl silsesquioxane)resin, at least one of a quaternary ammonium salt and an aminopropyltriethoxysilane salt, and at least a solvent.

US Patent Application 2018/0087150 to Kerrigan et al. discloses Polycarbosilazane containing formulations that comprise of Si—N containing precursors. The method of synthesizing the precursors is catalytic dehydrogenative coupling of carbosilanes with ammonia, amines, and amidine to produce Si—N containing precursors and produce H$_2$ as a byproduct as shown in Equation I below. The reaction is accelerated with the use of catalysts, such as metal carbonyl, Dicobalt Octacarbonyl. The targeted reaction temperature for catalytic dehydrogenative coupling may be ranging from 0 to 600° C.

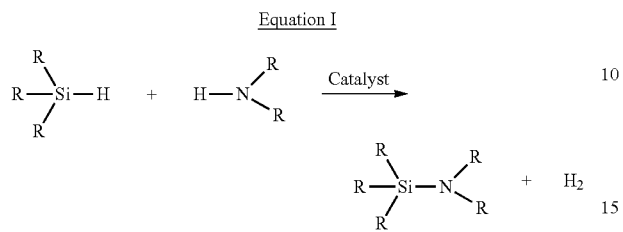

Equation I

SUMMARY

Disclosed is a silicon and carbon containing film forming composition comprising
a polycarbosilazane polymer or oligomer containing formulation,
the polycarbosilazane polymer or oligomer containing formulation consisting of silazane-bridged or cross-linked carbosilane monomers,
the carbosilane containing at least two —SiH$_2$— moieties, either as terminal groups (—SiH$_3$R) or embedded in a carbosilane cyclic compound,
wherein R is H, a C$_1$ to C$_6$ linear, branched, or cyclic alkyl- group, a C$_1$ to C$_6$ linear, branched, or cyclic alkenyl- group, or combination thereof.

The disclosed silicon and carbon containing film forming composition may include one or more of the following aspects:
the carbosilane having the formula:

$$R^1{}_aSi[-(CH_2)_b-SiH_2R^2]_c \quad (I)$$

wherein R$^1$, R$^2$ are independently H, a C$_1$-C$_6$ linear, branched or cyclic alkyl-group, a C$_1$-C$_6$ linear, branched or cyclic alkenyl- group, or combination thereof; a=0-2; b=1-4; c=4-a;
the carbosilane having the formula:

$$R^3{}_eC[-(CH_2)_f-SiH_2R^4]_g \quad (II)$$

wherein R$^3$, R$^4$ are independently H, a C$_1$-C$_6$ linear, branched or cyclic alkyl-group, a C$_1$-C$_6$ linear, branched or cyclic alkenyl- group, or combination thereof; e=0-2; f=0-3; g=4-e;
the carbosilane having the formula:

$$[\text{scaffold}]-[-(CH_2)_m-SiH_2R^5]_n \quad (III)$$

wherein R$^5$ is H, a C$_1$-C$_6$ linear, branched, or cyclic alkyl- group, a C$_1$-C$_6$ linear, branched or cyclic alkenyl- group, or combination thereof; m=0-4; n=2-4; and the scaffold is a hydrocarbon scaffold;
the carbosilane having the formula:

$$R^6{}_x\text{-}1,3,5\text{-trisilacyclohexane} \quad (IV)$$

wherein R$^6$ is a C$_1$-C$_6$ linear, branched or cyclic alkyl- or alkenyl- group; x=0-3;
the hydrocarbon scaffold being a hydrocarbon scaffold including a C$_3$-C$_{10}$ cyclic hydrocarbon scaffold containing silyl- group, —NH group, —O— ether group, or the like;
the carbosilane containing —Si—C$_n$—Si— unit (n≥1) unit(s) or a 1,3,5-trisilacyclohexane (TSCH) backbone;
the carbosilane containing —Si—C$_n$—Si— unit (n≥1) unit(s);
the carbosilane containing a 1,3,5-trisilacyclohexane (TSCH) backbone;
the carbosilane being selected from Si[—(CH$_2$)—SiH$_3$]$_4$, Si[—(CH$_2$)$_2$—SiH$_3$]$_4$, Si[—(CH$_2$)$_3$—SiH$_3$]$_4$, and Si[—(CH$_2$)$_4$—SiH$_3$]$_4$, R$^1$Si[—(CH$_2$)—SiH$_3$]$_3$, R$^1$Si[—(CH$_2$)$_2$—SiH$_3$]$_3$, R$^1$Si[—(CH$_2$)$_3$—SiH$_3$]$_3$, and R$^1$Si[—(CH$_2$)$_4$—SiH$_3$]$_3$, H$_3$Si—CH$_2$—SiH$_2$—CH$_2$—SiH$_3$ (bis(silylmethyl)silane), H$_3$Si—(CH$_2$)$_2$—SiH$_2$—(CH$_2$)$_2$—SiH$_3$(bis(2-silylethyl)silane), H$_3$Si—(CH$_2$)$_3$—SiH$_2$—(CH$_2$)$_3$—SiH$_3$ (bis(3-silylpropyl)silane), and H$_3$Si—(CH$_2$)$_4$—SiH$_2$—(CH$_2$)$_4$—SiH$_3$ (bis(4-silylbutyl)silane), C[—SiH$_3$]$_4$ (tetrasilylmethane), C[—(CH$_2$)—SiH$_3$]$_4$ (2,2-bis(silylmethyl)propane-1,3-diyl)bis(silane)), C[—(CH$_2$)$_2$—SiH$_3$]$_4$(3,3-bis(2-silylethyl)pentane-1,5-diyl)bis(silane)), and C[—(CH$_2$)—SiH$_3$]$_4$(4,4-bis(3-silylpropyl)heptane-1,7-diyl)bis (silane)), R$^1$C[—SiH$_3$]$_3$, R$^1$C[—(CH$_2$)—SiH$_3$]$_3$, R$^1$C[—(CH$_2$)$_2$—SiH$_3$]$_3$, and R$^1$C[—(CH$_2$)$_3$—SiH$_3$]$_3$, H$_3$Si—CH$_2$—SiH$_3$(bisilylmethane), H$_3$Si—(CH$_2$)$_5$—SiH$_3$ (1,5-disilylpentane)), and H$_3$Si—(CH$_2$)$_7$—SiH$_3$ (1,7-disilylheptane)), 1,3-disilylcyclopentane, 1,2-disilylcyclopentane, 1,4-disilylcyclohexane, 1,3-disilylcyclohexane, 1,2-disilylcyclohexane, 1,3,5-trsilylcyclohexane and 1,3,5-trisilylbenzene, 2-Me-TSCH, 2-Et-TSCH, 2-iPr-TSCH, 2-nPr-TSCH, 2-nBu-TSCH, 2-tBu-TSCH, 2-sBu-TSCH, 2-iBu-TSCH, 2,4-Me$_2$-TSCH, 2,4-Et$_2$-TSCH, 2,4-iPr$_2$-TSCH, 2,4-nPr$_2$-TSCH, 2,4-nBu$_2$-TSCH, 2,4-iBu$_2$-TSCH, 2,4-tBu$_2$-TSCH, 2,4-sBu$_2$-TSCH, 2,4,6-Me$_3$-TSCH, 2,4,6-Et$_3$-TSCH, 2,4,6-iPr$_3$-TSCH, 2,4,6-nPr$_3$-TSCH, 2,4,6-nBu$_3$-TSCH, 2,4,6-iBu$_3$-TSCH, 2,4,6-tBu$_3$-TSCH, 2,4,6-sBu$_3$-TSCH, wherein R$^1$ is H, a C$_1$-C$_6$ linear, branched, or cyclic alkyl- group, a C$_1$-C$_6$ linear, branched, or cyclic alkenyl- group, or combination thereof;
the carbosilane being 1,3,5,-trisilapentane (CAS No.: 5637-99-0);
the carbosilane being 1,3,5-trisilacyclohexane (CAS No.: 291-27-0);
the amine being selected from ammonia, amidine, hydrazine, hydroxylamine, monoalkylamine, diamines including ethylene diamine, or polyamines;
the amine containing at least two N—H bonds;
the at least two N—H bonds being on the same nitrogen atom or on separate nitrogen atoms;
the polycarbosilazane polymer or oligomer being produced by a catalytic dehydrocoupling (DHC) reaction selected from the group consisting of
a) two carbosilanes with two amines, wherein one of the two carbosilanes contains more than two —SiH$_2$R groups;
b) two carbosilanes with two amines, wherein one of the two amines contains more than two N—H bonds; and
c) more than two carbosilanes with more than two amines,
wherein R is H, a C$_1$-C$_6$ linear, branched, or cyclic alkyl- group, a C$_1$-C$_6$ linear, branched, or cyclic alkenyl- group, or combination thereof;
the polycarbosilazane polymer or oligomer being produced by a catalytic dehydrocoupling (DHC) reaction of two carbosilanes with two amines, wherein one of the two carbosilanes contains more than two —SiH$_2$R groups, wherein R is H, a C$_1$-C$_6$ linear, branched, or cyclic alkyl- group, a $C_1$-$C_6$ linear, branched, or cyclic alkenyl- group, or combination thereof;

the polycarbosilazane polymer or oligomer being produced by a catalytic dehydrocoupling (DHC) reaction of two carbosilanes with two amines, wherein one of the two amines contains more than two N—H bonds, wherein R is H, a $C_1$-$C_6$ linear, branched, or cyclic alkyl- group, a $C_1$-$C_6$ linear, branched, or cyclic alkenyl- group, or combination thereof;

the polycarbosilazane polymer or oligomer being produced by a catalytic dehydrocoupling (DHC) reaction of more than two carbosilanes with more than two amines, wherein R is H, a $C_1$-$C_6$ linear, branched, or cyclic alkyl- group, a $C_1$-$C_6$ linear, branched, or cyclic alkenyl- group, or combination thereof;

the percentage of any one of the carbosilanes ranging from 0.5% to 99.5% in molar percentage;

the percentage of any one of the amines ranging from 0.5% to 99.5% in molar percentage;

a catalyst used in the catalytic DHC reaction being $NH_4Cl$;

the polycarbosilazane polymer or oligomer containing formulation including a polysilane;

the polysilane containing more than two —$SiH_2R$ function groups, wherein R is H, a $C_1$-$C_6$ linear, branched, or cyclic alkyl- group, a $C_1$-$C_6$ linear, branched, or cyclic alkenyl- group, or combination thereof; and the polysilane being selected from neopentasilane (Si$(SiH_3)_4$), n-tetrasilane ($SiH_3(SiH_2)_2SiH_3$), 2-silyl-tetrasilane (($SiH_3)_2SiHSiH_2SiH_3$), trisilylamine ($N(SiH_3)_3$), or trisilyamine derivatives such as alkylamino-substituted trisilylamines or oligomers of trisilylamines.

Also, disclosed is a method of forming a silicon and carbon containing film on a substrate comprising the steps of:

forming a solution comprising a polycarbosilazane polymer or oligomer containing formulation that consists of silazane-bridged or cross-linked carbosilane monomers, the carbosilane containing at least two —$SiH_2$- moieties, either as terminal groups (—$SiH_2R$) or embedded in a carbosilane cyclic compound, wherein R is H, a $C_1$-$C_6$ linear, branched, or cyclic alkyl-group, a $C_1$-$C_6$ linear, branched, or cyclic alkenyl- group, or combination thereof; and contacting the solution with the substrate via a spin-on coating, spray coating, dip coating, or slit coating technique to form the silicon and carbon containing film.

The disclosed method may include one or more of the following aspects:

the method further comprising the step of pre-baking the silicon and carbon containing film under $N_2$ atmosphere at a temperature ranging from approximately 50° C. to 400° C.; and hardbaking the silicon and carbon containing film by a heat-induced radical reaction or a UV-Vis photo induced radical reaction in an atmosphere of $O_2$, $O_3$, $H_2O$, $H_2O_2$, $N_2O$, or NO, air, compressed air, or combination thereof at a temperature range of 200-1000° C. to convert the silicon and carbon containing film to a SiOC or SiOCN containing film with low k value;

the carbosilane having the formula:

$$R^1_aSi[-(CH_2)_b-SiH_2R^2]_c \quad (I)$$

wherein $R^1$, $R^2$ are independently H, a $C_1$-$C_6$ linear, branched or cyclic alkyl-group, a $C_1$-$C_6$ linear, branched or cyclic alkenyl- group, or combination thereof; a=0-2; b=1-4; c=4-a;

the carbosilane having the formula:

$$R^3_eC[-(CH_2)_f-SiH_2R^4]_g \quad (II)$$

wherein $R^3$, $R^4$ are independently H, a $C_1$-$C_6$ linear, branched or cyclic alkyl-group, a $C_1$-$C_6$ linear, branched or cyclic alkenyl- group, or combination thereof; e=0-2; f=0-3; g=4-e;

the carbosilane having the formula:

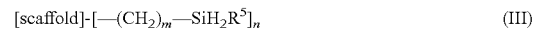

$$[scaffold]-[-(CH_2)_m-SiH_2R^5]_n \quad (III)$$

wherein $R^5$ is H, a $C_1$-$C_6$ linear, branched, or cyclic alkyl-group, a $C_1$-$C_6$ linear, branched or cyclic alkenyl-group, or combination thereof; m=0-4; n=2-4; and the scaffold is a hydrocarbon scaffold;

the carbosilane having the formula:

$$R^6_x\text{-1,3,5-trisilacyclohexane} \quad (IV)$$

wherein $R^6$ is a $C_1$-$C_6$ linear, branched or cyclic alkyl- or alkenyl- group; x=0-3;

the carbosilane being selected from Si[—($CH_2$)—$SiH_3$]$_4$, Si[—($CH_2$)$_2$—$SiH_3$]$_4$, Si[—($CH_2$)$_3$—$SiH_3$]$_4$, and Si[—($CH_2$)$_4$—$SiH_3$]$_4$, $R^1$Si[—($CH_2$)—$SiH_3$]$_3$, $R^1$Si[—($CH_2$)$_2$—$SiH_3$]$_3$, $R^1$Si[—($CH_2$)$_3$—$SiH_3$]$_3$, and $R^1$Si[—($CH_2$)$_4$—$SiH_3$]$_3$, $H_3$Si—$CH_2$—$SiH_2$—$CH_2$—$SiH_3$ (bis(silylmethyl)silane), $H_3$Si—($CH_2$)$_2$—$SiH_2$—($CH_2$)$_2$—$SiH_3$(bis(2-silylethyl)silane), $H_3$Si—($CH_2$)$_3$—$SiH_2$—($CH_2$)$_3$—$SiH_3$ (bis(3-silylpropyl)silane), and $H_3$Si—($CH_2$)$_4$—$SiH_2$—($CH_2$)$_4$—$SiH_3$ (bis (4-silylbutyl)silane), C[—$SiH_3$]$_4$ (tetrasilylmethane), C[—($CH_2$)—$SiH_3$]$_4$ (2,2-bis(silylmethyl)propane-1,3-diyl)bis(silane)), C[—($CH_2$)$_2$—$SiH_3$]$_4$(3,3-bis(2-silylethyl)pentane-1,5-diyl)bis(silane)), and C[—($CH_2$)—$SiH_3$]$_4$(4,4-bis(3-silylpropyl)heptane-1,7-diyl)bis (silane)), $R^1$C[—$SiH_3$]$_3$, $R^1$C[—($CH_2$)—$SiH_3$]$_3$, $R^1$C[—($CH_2$)$_2$—$SiH_3$]$_3$, and $R^1$C[—($CH_2$)$_3$—$SiH_3$]$_3$, $H_3$Si—$CH_2$—$SiH_3$(bisilylmethane), $H_3$Si—($CH_2$)$_5$—$SiH_3$(1,5-disilylpentane), and $H_3$Si—($CH_2$)$_7$—$SiH_3$(1,7-disilylheptane), 1,3-disilylcyclopentane, 1,2-disilylcyclopentane, 1,4-disilylcyclohexane, 1,3-disilylcyclohexane, 1,2-disilylcyclohexane, 1,3,5-trsilylcyclohexane and 1,3,5-trisilylbenzene, 2-Me-TSCH, 2-Et-TSCH, 2-iPr-TSCH, 2-nPr-TSCH, 2-nBu-TSCH, 2-tBu-TSCH, 2-sBu-TSCH, 2-iBu-TSCH, 2,4-$Me_2$-TSCH, 2,4-$Et_2$-TSCH, 2,4-$iPr_2$-TSCH, 2,4-$nPr_2$-TSCH, 2,4-$nBu_2$-TSCH, 2,4-$iBu_2$-TSCH, 2,4-$tBu_2$-TSCH, 2,4-$sBu_2$-TSCH, 2,4,6-$Me_3$-TSCH, 2,4,6-$Et_3$-TSCH, 2,4,6-$iPr_3$-TSCH, 2,4,6-$nPr_3$-TSCH, 2,4,6-$nBu_3$-TSCH, 2,4,6-$iBu_3$-TSCH, 2,4,6-$tBu_3$-TSCH, 2,4,6-$sBu_3$-TSCH, wherein $R^1$ is H, a $C_1$-$C_6$ linear, branched, or cyclic alkyl- group, a $C_1$-$C_6$ linear, branched, or cyclic alkenyl- group, or combination thereof;

the polycarbosilazane polymer or oligomer containing formulation containing a polysilane selected from neopentasilane (or 2,2-disilyltrisilane) (Si$(SiH_3)_4$), n-tetrasilane ($SiH_3(SiH_2)_2SiH_3$), 2-silyl-tetrasilane (($SiH_3)_2SiHSiH_2SiH_3$), trisilylamine ($N(SiH_3)_3$), or trisilyamine derivatives such as alkylamino-substituted trisilylamines or oligomers of trisilylamines;

the carbosilane being 1,3,5,-trisilapentane (CAS No.: 5637-99-0) or 1,3,5-trisilacyclohexane (CAS No.: 291-27-0);

the carbosilane being 1,3,5,-trisilapentane (CAS No.: 5637-99-0);

the carbosilane being 1,3,5-trisilacyclohexane (CAS No.: 291-27-0);

the polycarbosilazane polymer or oligomer is produced by a catalytic dehydrocoupling (DHC) reaction of
a) two carbosilanes with two amines, wherein one of the two carbosilanes contains more than two —$SiH_2R$ groups;
b) two carbosilanes with two amines, wherein one of the two amines contains more than two N—H bonds; or
c) more than two carbosilanes with more than two amines, where R is H, a $C_1$-$C_6$ linear, branched, or cyclic alkyl- group, a $C_1$-$C_6$ linear, branched, or cyclic alkenyl- group, or combination thereof; and a catalyst used in the catalytic DHC reaction being $NH_4Cl$.

Notation and Nomenclature

The following detailed description and claims utilize a number of abbreviations, symbols, and terms, which are generally well known in the art, and include:

As used herein, the indefinite article "a" or "an" means one or more.

As used herein, "about" or "around" or "approximately" in the text or in a claim means±10% of the value stated.

As used herein, "room temperature" in the text or in a claim means from approximately 20° C. to approximately 25° C.

The term "ambient temperature" refers to an environment temperature approximately 20° C. to approximately 25° C.

The term "substrate" refers to a material or materials on which a process is conducted. The substrate may refer to a wafer having a material or materials on which a process is conducted. The substrates may be any suitable wafer used in semiconductor, photovoltaic, flat panel, or LCD-TFT device manufacturing. The substrate may also have one or more layers of differing materials already deposited upon it from a previous manufacturing step. For example, the wafers may include silicon layers (e.g., crystalline, amorphous, porous, etc.), silicon containing layers (e.g., $SiO_2$, SiN, SiON, SiCOH, etc.), metal containing layers (e.g., copper, cobalt, ruthenium, tungsten, platinum, palladium, nickel, ruthenium, gold, etc.) or combinations thereof. Furthermore, the substrate may be planar or patterned. The substrate may be an organic patterned photoresist film. The substrate may include layers of oxides which are used as dielectric materials in MEMS, 3D NAND, MIM, DRAM, or FeRam device applications (for example, $ZrO_2$ based materials, $HfO_2$ based materials, $TiO_2$ based materials, rare earth oxide based materials, ternary oxide based materials, etc.) or nitride-based films (for example, TaN, TiN, NbN) that are used as electrodes. One of ordinary skill in the art will recognize that the terms "film" or "layer" used herein refer to a thickness of some material laid on or spread over a surface and that the surface may be a trench or a line. Throughout the specification and claims, the wafer and any associated layers thereon are referred to as substrates.

The term "wafer" or "patterned wafer" refers to a wafer having a stack of films on a substrate and at least the top-most film having topographic features that have been created in steps prior to the deposition of the low-k film.

The term "aspect ratio" refers to a ratio of the height of a trench (or aperture) to the width of the trench (or the diameter of the aperture).

Note that herein, the terms "film" and "layer" may be used interchangeably. It is understood that a film may correspond to, or related to a layer, and that the layer may refer to the film. Furthermore, one of ordinary skill in the art will recognize that the terms "film" or "layer" used herein refer to a thickness of some material laid on or spread over a surface and that the surface may range from as large as the entire wafer to as small as a trench or a line.

The standard abbreviations of the elements from the periodic table of elements are used herein. It should be understood that elements may be referred to by these abbreviation (e.g., Si refers to silicon, N refers to nitrogen, O refers to oxygen, C refers to carbon, H refers to hydrogen, F refers to fluorine, etc.).

The unique CAS registry numbers (i.e., "CAS") assigned by the Chemical Abstract Service are provided to identify the specific molecules disclosed.

As used herein, the term "hydrocarbon" refers to a saturated or unsaturated function group containing exclusively carbon and hydrogen atoms. As used herein, the term "alkyl group" refers to saturated functional groups containing exclusively carbon and hydrogen atoms. An alkyl group is one type of hydrocarbon. Further, the term "alkyl group" refers to linear, branched, or cyclic alkyl groups. Examples of linear alkyl groups include without limitation, methyl groups, ethyl groups, propyl groups, butyl groups, etc. Examples of branched alkyls groups include without limitation, t-butyl. Examples of cyclic alkyl groups include without limitation, cyclopropyl groups, cyclopentyl groups, cyclohexyl groups, etc.

As used herein, the term "carbosilane" refers to a linear, branched, or cyclic molecule containing Si, C and H atoms and at least two —$SiH_2R$ groups and may be written as $R_xSi_yH_z$ in a general formula, where x, y and z≥1.

As used herein, the term "polycarbosilazane" refers to an oligomer/polymer formed by at least two carbosilanes attached by a Si—NR—Si bonding. The polycarbosilazane is a linear, branched, or crosslinked polymer containing Si, C, H and N atoms and Si—NR—Si bonds.

As used herein, the abbreviation "Me" refers to a methyl group; the abbreviation "Et" refers to an ethyl group; the abbreviation "Pr" refers to any propyl group (i.e., n-propyl or isopropyl); the abbreviation "iPr" refers to an isopropyl group; the abbreviation "Bu" refers to any butyl group (n-butyl, iso-butyl, tert-butyl, sec-butyl); the abbreviation "tBu" refers to a tert-butyl group; the abbreviation "sBu" refers to a sec-butyl group; the abbreviation "iBu" refers to an iso-butyl group; the abbreviation "Ph" refers to a phenyl group; the abbreviation "Am" refers to any amyl group (iso-amyl, sec-amyl, tert-amyl); the abbreviation "Cy" refers to a cyclic hydrocarbon group (cyclobutyl, cyclopentyl, cyclohexyl, etc.).

Please note that the silicon-containing films, such as Si, SiN, SiO, SiOC, SiON, SiCON, are listed throughout the specification and claims without reference to their proper stoichiometry. The silicon-containing films may also include dopants, such as B, P, As, Ga and/or Ge. The fact that the film contains some residual hydrogen is also omitted from the film composition description. For instance, an SiOC film may contain residual H.

Ranges may be expressed herein as from about one particular value, and/or to about another particular value. When such a range is expressed, it is to be understood that another embodiment is from the one particular value and/or to the other particular value, along with all combinations within said range. Any and all ranges recited herein are inclusive of their endpoints (i.e., x=1 to 4 or x ranges from 1 to 4 includes x=1, x=4, and x=any number in between), irrespective of whether the term "inclusively" is used.

Reference herein to "one embodiment" or "an embodiment" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used herein, the term "independently" when used in the context of describing R groups should be understood to denote that the subject R group is not only independently selected relative to other R groups bearing the same or different subscripts or superscripts, but is also independently selected relative to any additional species of that same R group. For example in the formula $MR^1_x$ $(NR^2R^3)_{(4-x)}$, where x is 2 or 3, the two or three $R^1$ groups may, but need not be identical to each other or to $R^2$ or to $R^3$. Further, it should be understood that unless specifically stated otherwise, values of R groups are independent of each other when used in different formulas.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

BRIEF DESCRIPTION OF THE DRAWINGS

The foregoing and various other aspects, features, and advantages of the present invention, as well as the invention itself, may be more fully appreciated with reference to the following detailed description of the invention when considered in connection with the following drawings. The drawings are presented for the purpose of illustration only and are not intended to be limiting of the invention, in which.

DESCRIPTION OF PREFERRED EMBODIMENTS

Figure 1:
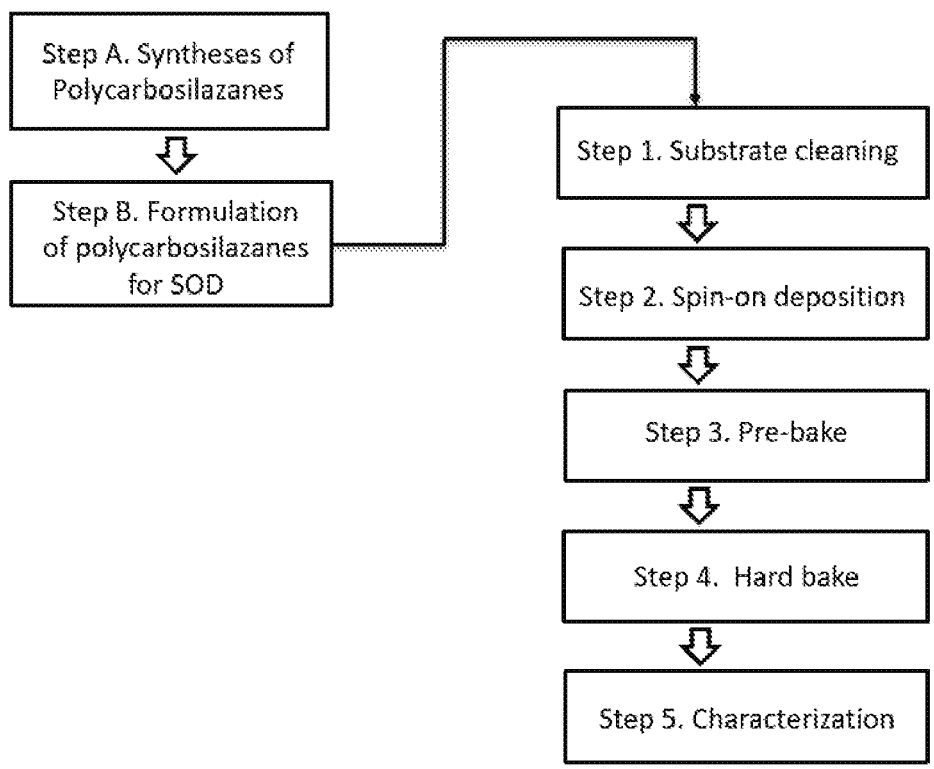
FIG. 1 is a simplified flow chart for a SOD process.

Disclosed are silicon and carbon containing film forming compositions comprising a polycarbosilazane containing formulation for deposition of Si-containing low-k dielectric film, methods of synthesizing the polycarbosilazanes and methods of using the silicon and carbon containing film forming compositions to deposit silicon and carbon containing films for manufacturing SiOC, SiOCN or SiCN devices. Particularly, the disclosed methods are spin-on deposition (SOD) of the silicon and carbon containing film forming composition comprising the polycarbosilazane containing formulation followed by pre-baking (or curing) and hardbaking processes to form a low-k dielectric film, such as a SiOC or SiOCN film.

The disclosed silicon and carbon containing film forming compositions have properties suitable for spin-on coating, spray coating, dip coating, or slit coating methods, such as low melting point (preferably being in liquid form at room temperature), and good wetting behavior on the substrate to be coated, and good thermal stability for shelf life and storage without degradation. Oligomers and/or polymers of the disclosed polycarbosilazanes suitable for these deposition techniques typically have a molecular weight ranging from approximately 300 Da to approximately 1,000,000 Da, preferably from approximately 500 Da to approximately 100,000 Da, and more preferably from approximately 1,000 Da to approximately 50,000 Da.

The oligomers and/or polymers of the disclosed polycarbosilazanes may be produced by catalytic dehydrogenative coupling (DHC) reactions of carbosilane monomers and amine monomers. The preferred carbosilanes used for syntheses of the disclosed polycarbosilazanes contain at least two —$SiH_2R$ groups (R is H, a $C_1$-$C_6$ linear, branched, or cyclic alkyl- group, a $C_1$-$C_6$ linear, branched, or cyclic alkenyl- group, or combination thereof; the —$SiH_2R$ may be part of a cyclic structure containing C and Si) to facilitate the reaction of the carbosilane with the amine in the DHC process to form polycarbosilazane. The amine used for the DHC reaction with the carbosilane may be selected from one or several of ammonia, amidine, hydrazine, hydroxylamine, monoalkylamine, diamines or polyamines or the like, so long as they contain at least two N—H bonds. Such N—H bonds may be on the same nitrogen atom, i.e. for a primary amine —$NH_2$, or on separate N atoms, for instance in a dialkyldiamine (RNH—$C_2H_4$—NHR). However, branched or cross-linked polycarbosilazanes may be formed if the amine or carbosilane contains at least 3 N—H bonds or at least 3 —$SiH_2R$ groups for branched and/or crosslinked polymerization. If either the amine or the carbosilane contain at least 3 N—H bonds or at least 3 —$SiH_2R$ groups, respectively, polycarbosilazanes may be obtained with extended crosslinks. The extent of crosslinks may be moderated by using mixed carbosilane monomers. For example, one may use a mixture of carbosilanes, one that contains at least 3 —$SiH_2R$ groups and the other one containing only 2 —$SiH_2R$ groups. Alternatively, the extent of crosslinks may be moderated by using mixed amine monomers. For example, one may use a mixture of amines, one that contains at least 3 N—H bonds and the other one containing only 2 N—H bonds. The percentage of any one of the carbosilanes or amines may range from 0.5% to 99.5% in molar percentage depending on a desired extent of crosslinks. Preferably, the ratio of amine to carbosilane monomers is selected so that the number of —NH functions in the DHC reaction stoichiometry is higher than the number of —SiH$_2$R functions.

The carbosilane monomers used for synthesizing the disclosed polycarbosilazanes may contain —Si—C$_n$—Si— unit (n≥1) unit that may be a linear, branched or cyclic saturated or unsaturated structure. In addition, the carbosilane monomers used for synthesizing the disclosed polycarbosilazanes may contain a 1,3,5-trisilacyclohexane (TSCH) backbone. The cyclic structure of the carbosilane monomer is preferred for low-k films as it creates a molecular scale porosity in the final film, this decreases the film density and dielectric constant. 1,3,5-trisilacyclohexane is found to be particularly interesting for this application.

The carbosilane monomers used for synthesizing the disclosed polycarbosilazanes have the following formulae:

$$R^1{}_a Si[-(CH_2)_b-SiH_2R^2]_c \quad (I)$$

wherein $R^1$, $R^2$ are independently H, a $C_1$-$C_6$ linear, branched or cyclic alkyl- group or alkenyl- group, or combination thereof; a=0-2; b=1-4; c=4-a; or $$R^3{}_e C[-(CH_2)_f-SiH_2R^4]_g \quad (II)$$

wherein $R^3$, $R^4$ are independently H, a $C_1$-$C_6$ linear, branched or cyclic alkyl- group or alkenyl- group, or combination thereof; e=0-2; f=0-3; g=4-e; or $$[scaffod]-[-(CH_2)_m-SiH_2R^5]_n \quad (III)$$

wherein $R^5$ is H, a $C_1$-$C_6$ linear, branched, or cyclic alkyl- group or alkenyl- group, or combination thereof; m=0-4; n=2-4; and the scaffold is a hydrocarbon scaffold; or $$R^6{}_x\text{-}1,3,5\text{-trisilacyclohexane} \quad (IV)$$

wherein $R^6$ is a $C_1$-$C_6$ linear, branched or cyclic alkyl- or alkenyl- group; x=0-3.

Formula III may also be expressed in a structure below.

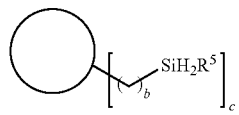

wherein

is a hydrocarbon scaffold. The examplary hydrocarbon scaffold includes, but is not limited to, a $C_3$-$C_{10}$ cyclic hydrocarbon scaffold. The hydrocarbon scaffold may contain silyl- group, —NH group, —O— ether group, or the like.

The carbosilane monomers shown in Formula I may contain at least two —SiH$_2$R$^2$ or —SiH$_3$ groups and hydrocarbon chains. For example, when a=0, b=1-4, c=4, and R$^2$=H, the carbosilane monomers include Si[—(CH$_2$)—SiH$_3$]$_4$ (tetrakis(silylmethyl)silane), Si[—(CH$_2$)$_2$—SiH$_3$]$_4$ (tetrakis(2-silylethyl)silane), Si[—(CH$_2$)$_3$—SiH$_3$]$_4$ (tetrakis(3-silylpropyl)silane), and Si[—(CH$_2$)$_4$—SiH$_3$]$_4$ (tetrakis(4-silylbutyl)silane), having a general structure:

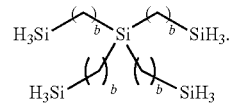

When a=1, b=1-4, c=3; $R^1$ is H, a $C_1$-$C_6$ linear, branched, or cyclic alkyl- group or a $C_1$-$C_6$ linear, branched, or cyclic alkenyl- group; and $R^2$=H, the carbosilane monomers include $R^1$Si[—(CH$_2$)—SiH$_3$]$_3$, $R^1$Si[—(CH$_2$)$_2$—SiH$_3$]$_3$, $R^1$Si[—(CH$_2$)$_3$—SiH$_3$]$_3$, and $R^1$Si[—(CH$_2$)$_4$—SiH$_3$]$_3$, having a general structure:

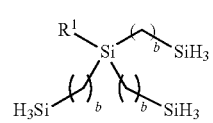

When a=2, b=1-4, c=2; $R^1$=H; and $R^2$=H, the carbosilane monomers include H$_3$Si—CH$_2$—SiH$_2$—CH$_2$—SiH$_3$ (1,3,5-trisilapentane (TSP) or bis(silylmethyl)silane) (CAS No. 5637-99-0), H$_3$Si—(CH$_2$)$_2$—SiH$_2$—(CH$_2$)$_2$—SiH$_3$ (bis(2-silylethyl)silane), H$_3$Si—(CH$_2$)$_3$—SiH$_2$—(CH$_2$)$_3$—SiH$_3$ (bis(3-silylpropyl)silane), and H$_3$Si—(CH$_2$)$_4$—SiH$_2$—(CH$_2$)$_4$—SiH$_3$ (bis(4-silylbutyl)silane). Here are the structures.

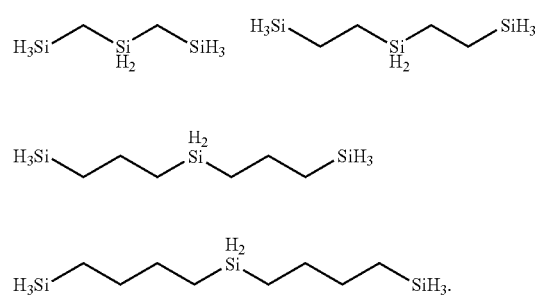

The carbosilane monomers shown in Formula II may contain at least two —SiH$_3$ groups and hydrocarbon chains. For example, when a=0, b=0-3, c=4; and $R^2$=H; the carbosilane monomers include C[—SiH$_3$]$_4$ (tetrasilylmethane), C[—(CH$_2$)—SiH$_3$]$_4$ ((2,2-bis(silylmethyl)propane-1,3-diyl) bis(silane)), C[—(CH$_2$)$_2$—SiH$_3$]$_4$((3,3-bis(2-silylethyl)pentane-1,5-diyl)bis(silane)), and C[—(CH$_2$)$_3$—SiH$_3$]$_4$((4,4-bis(3-silylpropyl)heptane-1,7-diyl)bis(silane)), having a general structure:

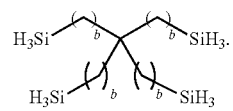

When a=1, b=0-3, c=3; and $R^1$ is H, a $C_1$-$C_6$ linear, branched, or cyclic alkyl- group or a $C_1$-$C_6$ linear, branched, or cyclic alkenyl- group, the carbosilane monomers include $R^1$C[—SiH$_3$]$_3$, $R^1$C[—(CH$_2$)—SiH$_3$]$_3$, $R^1$C[—(CH$_2$)$_2$—SiH$_3$]$_3$, and $R^1$C[—(CH$_2$)$_3$—SiH$_3$]$_3$, having a general structure:

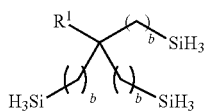

When a=2, b=0-3, c=2; $R^1$=H; and $R^2$=H; the carbosilane monomers include $H_3Si-CH_2-SiH_3$ (bisilylmethane), $H_3Si-(CH_2)_3-SiH_3$ (1,3-disilylpropane), $H_3Si-(CH_2)_5-SiH_3$ (1,5-disilylpentane), and $H_3Si-(CH_2)_7-SiH_3$ (1,7-disilylheptane).

In formula III, multiple carbosilane groups may be attached to a hydrocarbon scaffold such as cyclic rings and may form N—H bonds for polycarbosilazane formation. The carbosilane monomers shown in formula III may contain hydrocarbon scaffolds connected with two —$SiH_2R$ groups or carbosilyl groups. For example, when c=2 in formula III, the carbosilane monomers include:

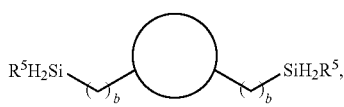

wherein

is a hydrocarbon scaffold, such as a $C_3$ to $C_{10}$ cyclic hydrocarbon scaffold that may contain silyl- group, —NH group, —O— ether group, or the like.
When $R^5$=H, the carbosilane monomers include

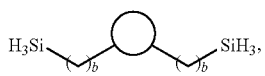

wherein

is a hydrocarbon scaffold, such as a $C_3$ to $C_{10}$ cyclic hydrocarbon scaffold that may contain silyl- group, —NH group, —O— ether group, or the like.

The exemplary carbosilanes include:

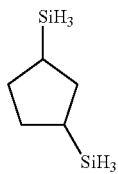

1,3-disilylcyclopentane    1,2-disilylcyclopentane

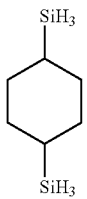

1,4-disilylcyclohexane    1,3-disilylcyclohexane

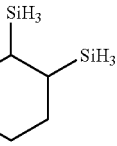

1,2-disilylcyclohexane

The carbosilane monomers shown in Formula III may contain at least two —$SiH_2R$ groups, hydrocarbon chains and hydrocarbon scaffolds. For example, when c=3, the carbosilane monomers include:

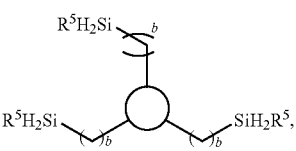

wherein

is a hydrocarbon scaffold, such as a $C_3$ to $C_{10}$ cyclic hydrocarbon scaffold that may contain silyl- group, —NH group, —O— ether group, or the like.

The carbosilane monomers in formula III may contain hydrocarbon scaffold connected with three —$SiH_3$ groups or carbosilyl groups. For example, when c=3; $R^5$=H, the carbosilane monomers include:

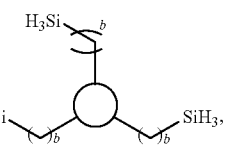

wherein

is a hydrocarbon scaffold, such as a $C_3$ to $C_{10}$ cyclic hydrocarbon scaffold that may contain silyl- group, —NH group, —O— ether group, or the like. The exemplary carbosilanes include 1,3,5-trisilylcyclohexane and 1,3,5-trisilylbenzene:

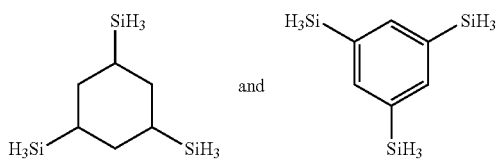

The carbosilane monomers shown in formula III may contain at least four —SiH$_2$R$^5$ groups and hydrocarbon chains and hydrocarbon scaffolds. That is, the carbosilane monomers may contain a hydrocarbon scaffold connected with four —SiH$_2$R$^5$ groups or carbosilyl groups. For example, when c=4, the carbosilane monomers include:

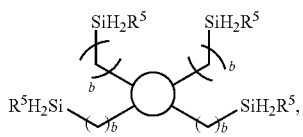

wherein

is a hydrocarbon scaffold, such as a C$_3$ to C$_{10}$ cyclic hydrocarbon scaffold that may contain silyl- group, —NH group, —O— ether group, or the like.

The carbosilane monomers shown in formula IV may contain one 1,3,5-trisilacyclohexane (TSCH) group, which forms a molecular size void in the carbosilane molecule and hydrocarbon chains. When x=0, R$^6$ is H, the carbosilane is TSCH (CAS No.: 291-27-0),

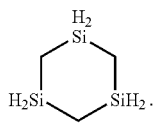

When x=1, R$^6$ is at C$_2$ position. The carbosilanes are 2-R$^6$-1,3,5-trsilacyclohexane (2-R$^6$-TSCH). Exemplary of the carbosilanes include 2-Me-TSCH, 2-Et-TSCH, 2-iPr-TSCH, 2-nPr-TSCH, 2-nBu-TSCH, 2-tBu-TSCH, 2-sBu-TSCH, 2-iBu-TSCH, etc. When x=2, two R$^6$ are at C$_2$ and C$_4$ positions, 2,4-R$^6_2$-1,3,5-trisilacyclohexane (2,4-R$^6_2$-TSCH). Exemplary of the carbosilanes include 2,4-Me$_2$-TSCH, 2,4-Et$_2$-TSCH, 2,4-iPr$_2$-TSCH, 2,4-nPr$_2$-TSCH, 2,4-nBu$_2$-TSCH, 2,4-iBu$_2$-TSCH, 2,4-tBu$_2$-TSCH, 2,4-sBu$_2$-TSCH. When x=3, three R$^6$ are at C$_2$, C$_4$ and C$_6$ positions, 2,4,6-R$^6_3$-1,3,5-trsilacyclohexane (2,4,6-R$^6_3$-TSCH). Exemplary of the carbosilanes include 2,4,6-Me$_3$-TSCH, 2,4,6-Et$_3$-TSCH, 2,4,6-iPr$_3$-TSCH, 2,4,6-nPr$_3$-TSCH, 2,4,6-nBu$_3$-TSCH, 2,4,6-iBu$_3$-TSCH, 2,4,6-tBu$_3$-TSCH, and 2,4,6-sBu$_3$-TSCH.

The disclosed polycarbosilazanes may be synthesized by a catalytic DHC reaction of a carbosilane shown in Formulae I, II, III and IV and liquid ammonia under pressure. The carbosilane shown in Formulae I, II, III and IV may be written as R$_x$Si$_y$H$_z$ in a general formula, where x, y and z≥1. Then the reaction scheme is as follows:

$$R_xSi_yH_z + NH_3 = R_xSi_yH_{(z-1)}NH_2 + H_2 \quad (1)$$

$$2R_xSi_yH_{(z-1)}NH_2 = [R_xSi_yH_{(z-1)}]NH + NH_3 \quad (2)$$

wherein x, y and z≥1; R is H, a C$_1$ to C$_6$ linear, branched, a cyclic alkyl-group or a C$_1$ to C$_6$ linear, branched, or cyclic alkenyl- group, or combination thereof. In one embodiment, R contains Si atoms with active H participating in the similar reactions. Alternatively, R may contain the following units: —SiH$_a$—C—SiH$_b$— and/or —SiH$_a$—C—C—SiH$_b$— and/or —SiH$_a$—C—C—C—SiH$_b$— and/or —SiH$_a$—C—C—C—C—SiH$_b$—, where a and b are integers from 0 to 3 (if a and/or b=3, the corresponding Si atom is terminal). Alternatively, R may contain TSCH group. Reaction (1) may not necessarily be followed by reaction (2). In this case, an oligomer having some terminal —NH$_2$ groups is obtained. Reaction (1) usually requires a catalyst. That is, Reaction (1) is a catalytic dehydrogenative coupling (DHC) of carbosilane(s) and amine(s). The catalytic DHC is a preferred synthesis pathway for polycarbosilazane syntheses because the reaction byproduct is hydrogen, which is vented out easily. The catalyst may be heterogeneous or homogeneous. Examples of the heterogeneous catalysts are Pt and Pt-group metals (supported or unsupported). Examples of the homogeneous catalysts include substituted or unsubstituted ammonium and phosphonium salts, metal amides, other Lewis and Bronstedt acids and bases soluble in the reaction media. For example, a homogeneous NH$_4$Cl is used in the Examples that follow. The process may be conducted in a batch mode or in a flow-through mode.

Theoretically, the entire process can be conducted with both reagents in gas phase, both reagents in liquid phase or with one of the starting materials in the liquid and the other in a gas phase. The reactions may proceed in presence of a solvent or without a solvent. The suitable solvents are hydrocarbons (e.g., hexane, heptane, etc.), aromatics (e.g., benzene, toluene, xylene, etc.), halogenated hydrocarbons (e.g., methylene chloride, chloroform, dichloroethane, chlorobenzene, etc.), ethers, amines and their mixtures. If ammonia is supposed to be in a vapor phase only, the reactions may be conducted at temperatures up to a stability limit of the chosen carbosilane.

The reaction temperature range could be from approximately 20° C. to approximately 300° C., preferably from approximately 100° C. to approximately 200° C. If ammonia acts a solvent or co-solvent, the reactions have to be conducted at temperature and pressure conditions where NH$_3$ exists as a liquid. The preferred temperature range is approximately 20° C. to approximately 100° C. under pressure. The preferred pressure range is about from 100 to 1500 psig.

The disclosed synthesis methods may be scaled up to produce a large amount of the product. For example, scaled up to approximately 1 kg to approximately 100 kg.

In order to make polymer chains of the disclosed polycarbosilazanes, the amines used herein each have to contain two or more N—H bonds that react with Si—H bonds in the carbosilane to form the polymer chains of the polycarbosilazanes. Two N—H bonds are the minimum requirement for polymer formation, and additional N—H bond needs to form silazane-bridged or crosslinked and/or branched polymers. The at least two N—H bonds may be attached to the same nitrogen atom or to the different nitrogen atoms in one amine. Specifically, the amines used herein are selected from ammonia, amidine, hydrazine, hydroxylamine, or C$_1$ to C$_6$ monoalkylamine, diamines including ethylene diamine, or polyamines, which contain at least two N—H bonds for polymer formation with the carbosilanes.

As described above, in order to enhance the silazane-bridges or crosslinks of the disclosed polycarbosilazanes, the carbosilane monomers should have at least two —SiH$_2$R groups (R is H, a $C_1$ to $C_6$ linear, branched, or cyclic alkyl-group, a $C_1$ to $C_6$ linear, branched, or cyclic alkenyl- group, or combination thereof) to react with N—H bond of the amine to form branched and/or crosslinked polycarbosilazane polymers, which improves certain physical properties of the resulting Si-containing film including etching properties. For example, the carbosilanes shown in Formula I have more than two —$SiH_2R^2$ groups and may participate in the catalytic DHC reaction with the amine to form polycarbosilazanes. Specially, the carbosilane monomers in Formula I may contain up to four carbosilyl groups attached to the Si atom. Thus, the minimum number of the carbosilyl group is two, which will produce three —$SiH_2R^2$ groups for crosslinked and branched polycarbosilazanes or oligomer polycarbosilazanes. In Formula I, the carbosilane monomer contains both carbon atoms adjustable based on the length of carbon chain as well as attached alkyl group $R^2$. Both $R^1$ and $R^2$ have additional functional groups such as olefinic group for crosslinking. Additionally, the carbosilyl groups attached to Si are not necessarily to be the same and they may be different in carbon chain length as well as with different function groups of $R^2$. However, for manufacturing, chemicals with the same functional groups will be easier to synthesize. The alkenyl group may be used as a function group for radical reaction for crosslink or polymerization with other alkenyl groups in the polycarbosilazane in the curing and hardbaking steps. The number of $R^1$ may be from 0 to 2. When number of $R^1$ is zero, the monomer is tetra-substituted.

As described above, in order to synthesize polycarbosilazanes from carbosilane(s) and amine(s) through Si—N bond formation by a catalytic DHC process, the carbosilane needs to have at least two Si—H bonds and the amine needs to have at least at least two N—H bonds as showed in Equation II below.

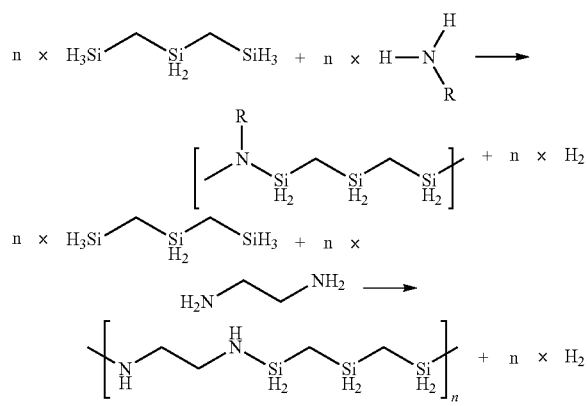

Branched or crosslinked (or silazane-bridged) polycarbosilazanes through Si—N bond formation require that one of the carbosilane monomers or one of the amines has to have three functional groups, either three or more —$SiH_2R^2$ groups (or Si—H bonds) in the carbosilane or three or more N—H bonds in the amine to participate in a chain growth, crosslinking and branching. An example of the crosslinked polycarbosilazanes is shown in Equation III below. The carbosilanes may be a mixture of a two Si—H bond containing carbosilane and a three Si—H bond containing carbosilane. Extent of the crosslinks may be moderated by adjusting a mixture ratio of the carbosilane having two Si—H groups and the carbosilane having three or more Si—H groups while the amine remains two N—H bonds. Similarly, the amines may be a mixture of a two N—H bond containing amine and a three N—H bond containing amine. The percentage of one carbosilane monomer in the mixture of the two carbosilanes may range from 0.5% to 99.5% in molar percentage depending on desired crosslinks. Similarly, a mixture of a two N—H bond containing amine and a three N—H bond containing amine may be applied to the catalytic DHC reaction with carbosilanes. The percentage of one amine in the mixture of the two amines may range from 0.5% to 99.5% in molar percentage depending on desired crosslinks. The amines used herein include ammonia, alkylamine, alkenyl amine, hydrazine, amidine, and the like. A polysilanes and polyhalosilane may be used as a crosslink additive or reagent to react with N—H bonds to enhance the crosslinked and branched polymerization. Alternatively, additional crosslinks may be formed by using the carbosilane, or amine having unsaturated carbon-carbon bonds (i.e., C=C and/or C≡C) and additional Si—H bond generated through radical reactions (e.g., curing and hard baking steps) following the SOD. The radical reaction may be induced by UV-Vis light or heat in the hardbaking process described below.

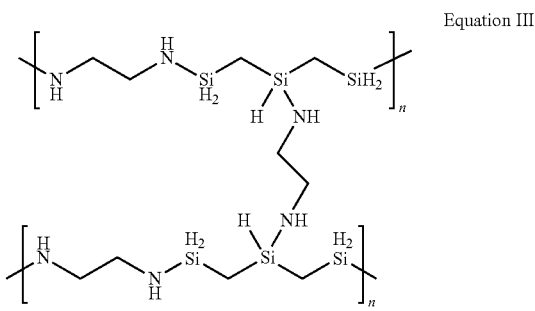

Equation III

The disclosed also include processes of making polycarbosilazane having crosslinks with a mixture of carbosilanes and/or with a mixture of amines. The disclosed polycarbosilazanes may be synthesized with a mixture of carbosilanes and a mixture of amines. A mixture of two carbosilanes contains one carbosilane having three or four —$SiH_2R^2$ groups and the other carbosilane having two —$SiH_2R^2$ groups. The carbosilane having three or four —$SiH_2R^2$ will be the crosslink sites. Similarly, a mixture of two amines contains one amine having three or more N—H bonds and the other amines containing two N—H bonds. Again, the percentage of any one of the carbosilanes or amines in the mixture may range from 0.5% to 99.5% in molar percentage.

The mixture of carbosilanes and amines may include one carbosilane and one amine for forming the polycarbosilazane. Alternatively, the mixture of carbosilanes and amines may include more than one carbosilanes or more than one amines for forming the branched and/or crosslinked polycarbosilazanes.

In one embodiment, the process of forming the polycarbosilazanes may be performed with two carbosilanes, in which one carbosilane contains more —$SiH_2R$ functional groups than the other for enhancing a crosslink polymerization reaction with amines.

In yet another alternative, the process of forming the polycarbosilazanes may be performed with two amines, in which one amine contains more N—H bonds than the other for enhancing a crosslink polymerization reaction with carbosilanes.

In yet another alternative, the process of forming the polycarbosilazanes may be performed with more than two carbosilanes with at least one amine.

In yet another alternative, the process of making the polycarbosilazanes may be performed with more than two amines with at least one carbosilane.

In yet another alternative, the process of making the polycarbosilazanes may be performed with a combination of multiple carbosilanes and multiple amines.

The disclosed silicon and carbon containing film forming compositions may contain other monomers, such as polysilanes. The polysilanes contain no carbon chain and have at least three —SiH$_2$R groups favorable of forming branched and/or crosslinked polymers along with the polycarbosilazanes. Exemplary polysilanes include neopentasilane (Si(SiH$_3$)$_4$), n-tetrasilane (SiH$_3$(SiH$_2$)$_2$SiH$_3$), 2-silyl-tetrasilane ((SiH$_3$)$_2$SihSiH$_2$SiH$_3$), trisilylamine (N(SiH$_3$)$_3$) or trisilyamine derivatives such as alkylamino-substituted trisilylamines or oligomers of trisilylamines, including but not limited to:

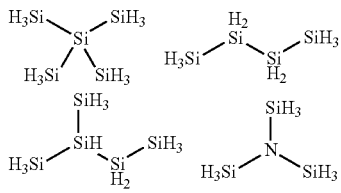

The disclosed polycarbosilazane containing formulation are suitable for being used in a coating formulation, preferably a spin-on coating or SOD applications due to at least partially to the benefits discussed above for Si—H bonds. The amino ligand may also provide improved thermal stability, as well as an additional N and/or C source for the thermal stability of the resulting film.

The disclosed silicon and carbon containing film forming composition typically contains 1-20% by weight of the non-volatile polycarbosilazane oligomer/polymer in a solvent or solvent mixture, preferably 2% to 10%. The solvent or solvent mixture is selected from at least one of hydrocarbons, aromatic solvents such as toluene, xylene or mesitylene, ethers such a tert-butyl ethers, THF or glymes, amines such as trialkylamine or dialkylamine, etc. The disclosed silicon and carbon containing film forming compositions may include other components to improve the overall resulting film properties, improve the wettability to the surface, tune the final film composition, and reduce the shrinkage of the film during the curing and baking steps. As such, the disclosed silicon and carbon containing film forming compositions may contain catalysts, surfactants, wetting agents, and other polymers, oligomers or monomers such as, but is not limited to, polysilazane, polycarbosilanes, polysilanes, metal or metalloid organometallic monomers or oligomers.

Also disclosed are methods of using the disclosed silicon and carbon containing film forming compositions in coating deposition methods, such as spin-on coating, spray coating, dip coating or slit coating techniques. To be suitable for coating methods, the disclosed polycarbosilazanes should have a molecular weight ranging from approximately 300 Da to approximately 1,000,000 Da, preferably from approximately 500 Da to approximately 100,000 Da, and more preferably from approximately 1,000 Da to approximately 50,000 Da.

The disclosed methods provide for the use of the silicon and carbon containing film forming compositions for deposition of silicon-containing films, specifically silicon-carbon-containing films. The disclosed methods may be useful in the manufacture of semiconductor, photovoltaic, LCD-TFT, optical coatings, or flat panel type devices. The method include: a) applying a liquid form of the disclosed silicon and carbon containing film forming compositions comprising the polycarbosilazane containing formulations on a substrate, b) curing to remove the solvent or solvents and form a polycarbosilazane film on at least parts of the substrate, and c) hardbaking the polycarbosilazane film in an oxidative atmosphere to convert at least some of the Si—NR—Si (silazane) bridges between the carbosilane monomers to Si—O—Si (siloxane) bridges, under conditions where at least part of the carbosilane backbone structure remains.

Prior to spin coating, the substrate may be exposed to a treatment and surface modification aiming at improving the wettability of the silicon and carbon containing film forming composition on the substrate. This treatment may be a mere solvent exposure, or a chemical treatment aiming at modifying the chemical surface composition. The surface modification may be carried in the gas phase or by exposing the substrate to a solution containing the surface modifying agent. The surface modifying agent may contain chemical functions that will chemically react during the curing or the baking step to improve the adhesion of the film to the substrate. Example of such chemical modification agents have the formula $X_xSiR_{4-x}$, or SiR$_3$—NH—SiR$_3$ in which X is a chemical group reactive with surface hydroxyl groups such as halide, alkylamino, acetamide, etc., and R is independently selected from H, a $C_1$ to $C_{20}$ alkyl, alkenyl, or alkyne group, and x=1,2,3. For instance, the surface modification chemical may be Me$_3$Si—NMe$_2$. The surface modifying group may preferentially react with certain area of the substrate and create a preferential adhesion of the polycarbosilazane on certain areas, leading to at least partially selective deposition of the polycarbosilazane.

SOD generally consists of three steps: spin-on coating, soft baking (or curing), and hard baking. A liquid form or solution of the disclosed polycarbosilazane containing formulation may be applied directly to the center of a substrate. The solution is then evenly distributed to the entire substrate during a spinning process forming a film on the substrate. A film thickness may be controlled by adjusting a concentration of the disclosed polycarbosilazane containing formulation, the solvent or solvent mixture choice, and the spin rate or rates if the spin recipe has several steps. The as-deposited film may be then baked on a hot plate or other heating equipment for a period of time to vaporize the solvent(s) or volatile components of the film. The soft bake temperature may be varied from 50 to 400° C., depending on the property of the solvent. The soft bake may be carried in an inert atmosphere to the polycarbosilazane film, or to an atmosphere that contains O$_2$ and/or H$_2$O, leading to a pre-reaction of the polycarbosilazane film. Eventually, the hard bake process may be carried out by annealing the substrate in an oxidizing atmosphere, such as O$_2$, O$_3$, H$_2$O, H$_2$O$_2$, N$_2$O, NO, air, compressed air and combination thereof, at a temperature ranging from 200 to 1000° C. The film quality may be improved by optimizing a ramping rate, temperature, annealing duration, and oxidizer combinations, etc. The extent of the conversion of the silazane bridges to siloxane bridges can be controlled by the annealing temperature, the composition of the annealing atmosphere, and by the annealing time.

Exemplary coating deposition methods include spin-on coating or spin-on deposition (SOD). FIG. 1 provides a flow chart of an exemplary SOD process following the formation and formulation of polycarbosilazanes for SOD. One of ordinary skill in the art will recognize that fewer or additional steps than those provided in FIG. 1 may be performed without departing from the teachings herein. One of ordinary skill in the art will further recognize that the process is preferably performed under an inert atmosphere to prevent undesired oxidation of the film and/or in a clean room to help prevent contamination to prevent particle contamination of the film. In Step A, as described above, the polycarbosilazanes are synthesized by a catalytic DHC reaction of the disclosed carbosilanes shown in Formula I, II, III and IV and amines. Step B is the formulation of the synthesized polycarbosilazanes for SOD process. The synthesized polycarbosilazanes may then be separated and filtered to remove reactants, catalysts, solid by-products, undesired long-chain solid polymers or the like. Thereafter, the polycarbosilazane containing formulation is prepared for the SOD, which may contain 1-20% polycarbosilazane in a solvent. One of ordinary skill in the art will recognize that the required duration of the SOD process, the spin acceleration rate of the substrate, the solvent evaporation rate, etc., are adjustable parameters that require optimization for each new formulation in order to obtain the target film thickness and uniformity (see, e.g., University of Louisville, Micro/Nano Technology Center-Spin Coating Theory, October 2013). In addition, depending on the target Si-containing film, the silicon and carbon containing film forming composition may include additional reagents, such as, additives and/or surfactants, etc. for enhancing the polymerization and the connectivity or crosslink of the SOD film through a hard-baking process. For instance, the silicon and carbon containing film forming composition may include a polysilane that contains more than two —$SiH_2R$ function groups, wherein R is H, a $C_1$-$C_6$ linear, branched, or cyclic alkyl- group, a $C_1$-$C_6$ linear, branched, or cyclic alkenyl- group, or combination thereof, to enhance a crosslinked and branched polymerization of the target film.

Next, a planar or patterned substrate on which the Si-containing film is to be deposited may be cleaned or prepared for the deposition process in Step 1. High purity gases and solvents are used in the preparation process. Gases are typically of semiconductor grade and free of particle contamination. For semiconductor usage, solvents should be particle free, typically less than 100 particle/mL (0.5 µm particle, more preferably less than 10 particles/mL) and free of non-volatile residues that would lead to surface contamination. Semiconductor grade solvents having less than 50 ppb metal contamination (for each element, and preferably less than 5 ppb) are advised.

In Step 1, the substrates (planar or patterned substrates) or wafers is cleaned using typical chemical cleaning agents in the art, such as, isopropanol (IPA), acetone or the like. The cleaning step is mainly to remove any contaminations on the substrates surface. One of ordinary skill in the art may determine the appropriate wafer preparation process based at least upon the substrate material and degree of cleanliness required. After the substrate cleaning preparation, the clean substrate is then transferred into a spin coater at Step 2. A liquid form or solution of the polycarbosilazane containing formulation is dispensed onto the substrate. The spin rates may be adjusted typically from 1000 rpm to 10000 rpm. The substrate is spun until a uniform Si-containing film formed on the entire surface of the substrate. The spinning time may vary from 10 s to 3 min. One of ordinary skill in the art will recognize that this spin-on deposition process may be conducted either in a static mode (sequentially) or a dynamic mode (concurrently). This spin-on deposition is preferred to be conducted in a controlled gas environment. For example, in a controlled $O_2$ level or $H_2O$ level. One of ordinary skill in the art will recognize that a required duration of the spin coating process, the acceleration rate, the solvent evaporation rate, etc., are adjustable parameters that require optimization for each new formulation of the polycarbosilazane containing formulation in order to obtain a target film thickness and uniformity (see, e.g., University of Louisville, Micro/Nano Technology Center-Spin Coating Theory, October 2013).

After the Si-containing film is formed on the substrate, the substrate is pre-baked or soft baked at Step 3 to remove any remaining volatile organic components of the polycarbosilazane containing formulation and/or by-products from the spin-coating process. The pre-bake may take place in a thermal chamber or on a hot plate at a temperature ranging from approximately 50° C. to approximately 400° C. for a time period ranging from approximately 1 minute to approximately 30 minutes. After pre-bake, the Si-containing film on the substrate is then cured to a desired dielectric film, such as a SiOC film, through a hard bake process (Step 4).

The hard bake process may be carried out by a heat-induced radical reaction for polymerization of olefinic groups in the silicon-containing film (i.e., the polycarbosilazane film) through thermal annealing in an oxidizing atmosphere at a temperature ranging from approximately 200° C. to approximately 1000° C. for a period ranging from approximately 30 minutes to approximately 4 hours. The oxidizers may be selected from $O_2$, $O_3$, $H_2O$, $H_2O_2$, $N_2O$, NO, air, compressed air and combination thereof. Alternatively, the Si-containing film may be cured through UV-curing, that is, a UV-Vis photo induced radical reaction for polymerization of olefinic groups in the silicon-containing film (i.e., the polycarbosilazane film). The Si-containing film is subjected to UV-curing at the wavelength ranges from 190 to 400 nm using a monochromatic or polychromatic source. In another alternative, both the thermal and UV process may be performed at the same temperature and wavelength criteria specified for Step 4. One of ordinary skill in the art will recognize that the choice of curing methods and conditions will be determined by the target silicon-containing film desired.

In Step 5, the cured film is characterized using standard analytic tools. Exemplary tools include, but are not limited to, ellipsometers, x-ray photoelectron spectroscopy, atomic force microscopy, x-ray fluorescence, fourier-transform infrared spectroscopy, scanning electron microscopy, secondary ion mass spectrometry (SIMS), Rutherford backscattering spectrometry (RBS), profilometer for stress analysis, or combination thereof.

Briefly, the liquid form of the disclosed silicon and carbon containing film forming composition may be applied directly to the center of the substrate and then spread to the entire substrate by spinning or may be applied to the entire substrate by spraying. When applied directly to the center of the substrate, the substrate may be spun to utilize centrifugal forces to evenly distribute the composition over the substrate. Alternatively, the substrate may be dipped in the silicon and carbon containing film forming composition. The resulting film may be dried at room temperature for a period of time to vaporize the solvent or volatile components of the film or dried by force-drying or baking or by the use of one or a combination of any following suitable process including thermal curing and irradiations, such as, ion irritation, electron irradiation, UV and/or visible light irradiation, etc.

The disclosed silicon and carbon containing film forming compositions comprising the polycarbosilazane containing formulation may be used to form spin-on dielectric film formulations, for lithographic applications such as tone inversion or for anti-reflective films. For example, the disclosed silicon and carbon containing film forming compositions may be included in a solvent or solvent mixture and applied to a substrate to form a polycarbosilazane film. If necessary, the substrate may be rotated to evenly distribute the silicon and carbon containing film forming composition across the substrate. One of ordinary skill in the art will recognize that the viscosity of the silicon and carbon containing film forming compositions will contribute as to whether rotation of the substrate is necessary. The resulting polycarbosilazane film may be heated under an inert gas, such as argon, helium, or nitrogen and/or under reduced pressure. Alternatively, the resulting polycarbosilazane film may be heated under a reactive gas like $NH_3$ or hydrazine to enhance the connectivity and nitridation of the film. Electron beams or ultraviolet radiation may be applied to the resulting polycarbosilazane film. The reactive groups of the disclosed polycarbosilazanes (i.e., the direct Si—N, N—H or Si—H bonds) may prove useful to increase the connectivity of the polymer obtained. Alternatively, the resulting polycarbosilazane film may be heated under a reactive gas like $O_3$ to enhance the connectivity and oxidization of the resulting polycarbosilazane film so that nitrogen in the resulting polycarbosilazane film is converted to oxygen. Thus, nitrogen in the resulting polycarbosilazane film may be completely or at least partially replaced with oxygen to form a target SiOC or SiOCN film after a hard bake.

The silicon-containing films resulting from the processes discussed above may include SiOC, SiOCN, SiNC. However, the polycarbosilazane oligomer solution may be mixed with other polymers or oligomers (co-reactants) to form films containing other elements as well such as B, Ge, Ga, Al, Zr, Hf, Ti, Nb, V, Ta. One of ordinary skill in the art will recognize that by selection of the appropriate polycarbosilazane containing formulation and co-reactants, the desired film composition may be obtained.

Unless deliberately added to the disclosed silicon and carbon containing film forming compositions, the concentration of trace metals and metalloids in the silicon and carbon containing film forming composition may each range from approximately 0 ppbw to approximately 500 ppbw, preferably from approximately 0 ppbw to approximately 100 ppbw, and more preferably from approximately 0 ppbw to approximately 10 ppbw. One of ordinary skill in the art will recognize that extraction using a reagent, such as hydrofluoric, nitric or sulfuric acid, and analysis by atomic absorption spectroscopy, x-ray fluorescence spectroscopy, or similar analytical techniques may be used to determine the trace metal and metalloid concentrations.

EXAMPLES

The following non-limiting examples are provided to further illustrate embodiments of the invention. However, the examples are not intended to be all-inclusive and are not intended to limit the scope of the inventions described herein.

Example 1

Synthesis of Oligomeric Aminosilanes Using TSP

Synthesis of oligomeric aminosilanes using TSP was performed by a catalytic DHC reaction. The catalytic DHC reaction was conducted between TSP and liquid $NH_3$ in the presence of a homogeneous catalyst ($NH_4Cl$).

Inside a glove box, a 60 cc stainless steel reactor equipped with a magnetic stirrer bar and a pressure gauge was charged with 1.08 g (20.1 mmol) $NH_4Cl$ and 1.81 g (15.0 mmol) of TSP. The reactor was sealed and connected to a manifold on a bench. It was frozen in liquid $N_2$, vacuumed and 6.9 g (0.41 mol) of $NH_3$ was condensed into it. The reactor was placed on top of a magnetic stirrer plate and gradually heated up to 80° C. while monitoring the pressure. When the pressure build up indicated accumulation of the expected amount of $H_2$, the reactor was cooled down with liquid $N_2$ and about 30 mmol of $H_2$ was pumped out. Excess of $NH_3$ was removed from the reactor cooled down to −20° C. The reactor was open in a glove box; toluene was added; the content was filtered out and the filtrate was analyzed. According to GC and NMR, the filtrate contained silazanes. Gravimetric test (removal of volatiles down to 0.5 T at 20° C.) showed the content of oligomeric aminosilanes was about 15% by weight.

Example 2

Synthesis of Polycarbosilazane Using TSCH

Synthesis of polycarbosilazane using TSCH was performed by a catalytic DHC reaction (scale up). The catalytic DHC reaction was conducted between TSCH and liquid $NH_3$ in the presence of a homogeneous catalyst ($NH_4Cl$).

Figure 2:
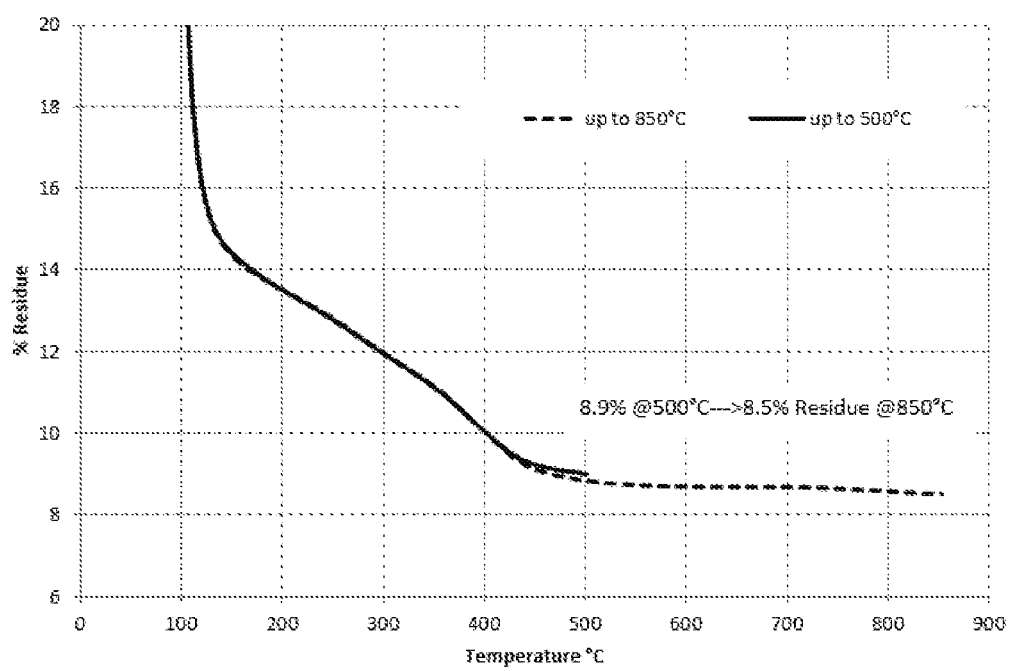
FIG. 2 is a thermogravimetric analysis (TGA) graph of the TSCH-based polycarbosilazane solution.

Inside a glove box, a 600 cc stainless steel PARR reactor was charged with 8.2 g (0.15 mmol) $NH_4Cl$ and 18.0 g (0.136 mmol) of TSCH. The reactor was sealed and connected to a manifold on a bench. It was frozen in liquid $N_2$, vacuumed and 72.5 g (4.3 mol) of $NH_3$ were condensed into it. The reactor was gradually heated up to 95° C. while monitoring the pressure. When the pressure build up indicated accumulation of the expected amount of $H_2$, the reactor was cooled down with liquid $N_2$ and about 0.38 mol of $H_2$ was pumped out. Excess of $NH_3$ was removed from the reactor cooled down to −20° C. The reactor was open in a glove box; Toluene was added; the content was filtered out and the filtrate was analyzed. According to NMR and FTIR the filtrate contained polycarbosilazanes. GPC (dimodal chromatogram) test indicated weight average molecular weight (Mw) 840 Da, number average molecular weight (Mn) 780 Da, polydispersity index (PDI) 1.1, where PDI=Mw/Mn. TGA to 500° C. and 850° C. in $N_2$ stream showed the residue of 8.9 and 8.5%, respectively (see FIG. 2).

Example 3

SiOC Low-k Film Formed by SOD Using TSCH-Containing Polycarbosilazane

Figure 3:
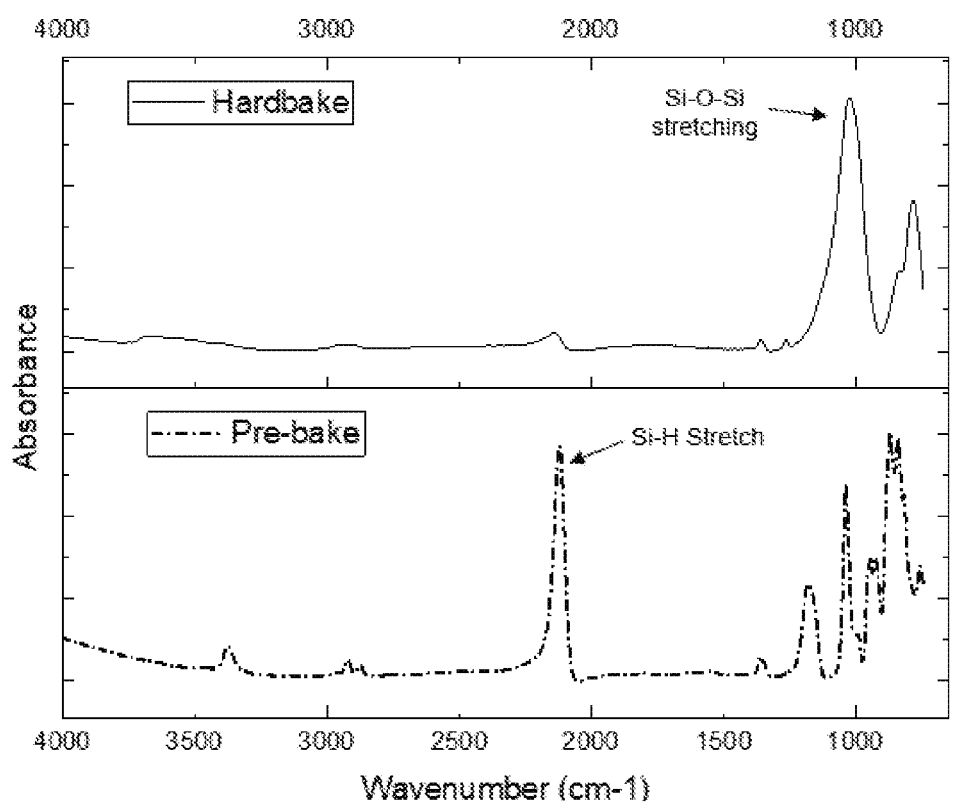
FIG. 3 is a FTIR spectrum comparison of pre-bake of a SOD film at 200° C. under $N_2$ and hardbake of the prebaked SOD film at 350° C. in air for about 30 min.
Figure 4:
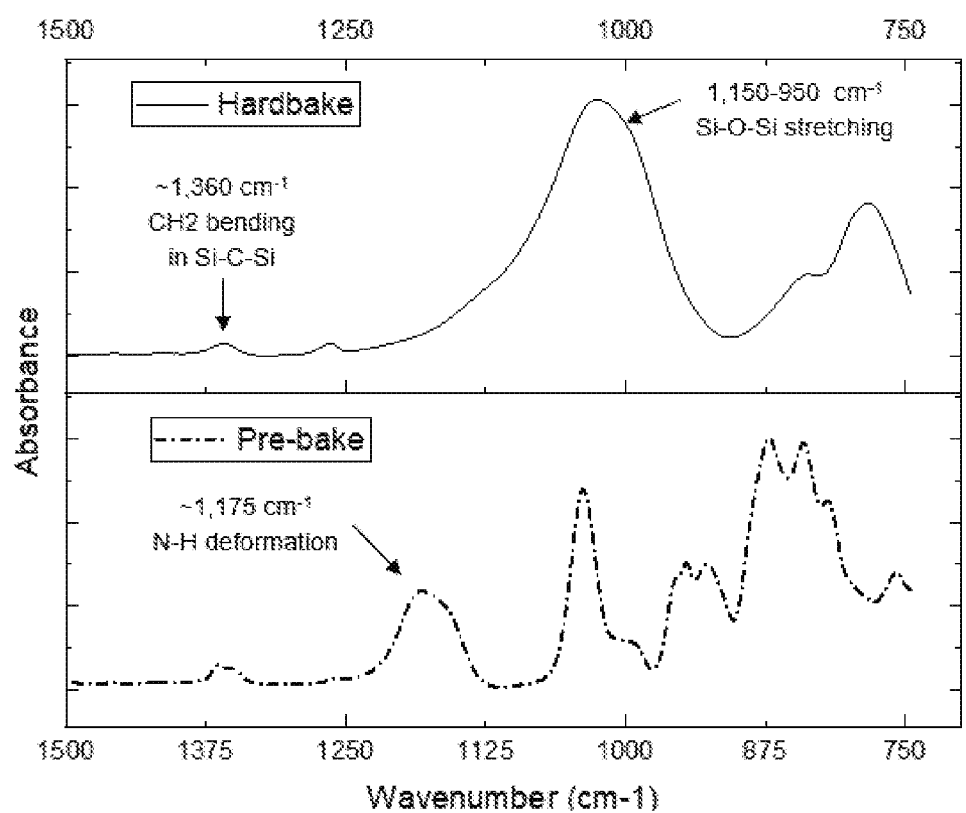
FIG. 4 is the low frequency region (1,500-650 $cm^{-1}$) FTIR spectrum of FIG. 3.
Figure 5:
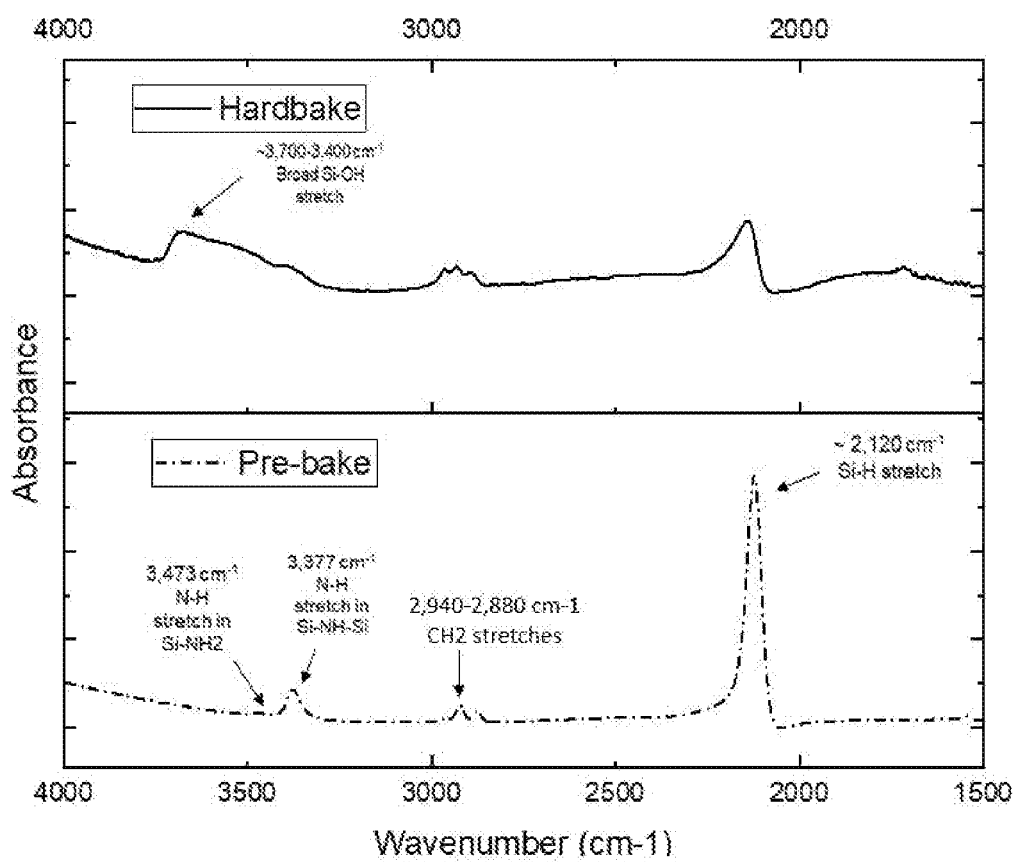
FIG. 5 is the high frequency region (4,000-1,500 $cm^{-1}$) FTIR spectrum of FIG. 3.

A Si substrate was cleaned through sonication process in isopropanol (IPA) and acetone solutions at room temperature for approximately 10 to 20 min. A SOD film formed on the substrate by using TSCH-containing polycarbosilazane was obtained following a SOD process as described above in FIG. 1. The SOD film was then prebaked at 200° C. for 5 min under $N_2$ atmosphere and hardbaked in air for 30 min at 350° C. FIG. 3 is a FTIR spectrum comparison of pre-bake of the SOD film at 200° C. under $N_2$ and hardbake of the prebaked SOD film at 350° C. in air for about 30 min. The FTIR results show the growth of Si—O—Si (around 1,150-950 $cm^1$) and the reduction of Si—H stretch (at about 2,120 $cm^{-1}$) after hardbaking. FIG. 4 is the low frequency region (1,500-650 $cm^{-1}$) FTIR spectrum of FIG. 3. As shown, after the hardbake, Si—O—Si is growing, N—H around 1,175 $cm^{-1}$ disappears and Si—C—Si at 1,360 $cm^{-1}$ is maintaining, indicating N is replaced by O in the prebaked SOD film and the hardbaked SOD film contains SiOC and Si—O—Si. FIG. 5 is the high frequency region (4,000-1,500 $cm^{-1}$) FTIR spectrum of FIG. 3. As shown, after the hardbake, the Si—H bond is reducing, $CH_2$ remains but slightly shifted, N—H bonds at 3,473 $cm^{-1}$ is gone, N—H bonds at 3,377 $cm^{-1}$ is reduced but still exists, and Si—OH at around 3,700-3,400 $cm^{-1}$ appears and no C=O bond is found, indicating N is replaced by O in the prebaked SOD film and the hardbaked SOD film contains SiOC. Since N—H bonds at 3,377 $cm^{-1}$ still exists, N may remain in the hardbaked film that may contain SiOCN. The thickness and the shrinkage of the hardbaked SOD film are listed in Table 1 with an average of 3 measurements for each parameter. The thicknesses of the prebaked SOD film and the thickness of hardbaked SOD film have been measured by Ellipsometer. The FTIR peck assignments are listed in Table 2.

TABLE 1

| Polymer | Film thickness (nm) | | Hardbake atmosphere | Shrinkage (%) |
| | Prebake | Hardbake | | |
| --- | --- | --- | --- | --- |
| TSCH | 325 | 311 | air | 4.6 |
| TSP | 208 | 183 | air | 12.0 |

TABLE 2

FTIR Peak Assignments

| Wavenumber ($cm^{-1}$) | Assignment |
| --- | --- |
| 950-930 | Si—$H_2$ deformation |
| 1,150-950 | Si—O—Si phonons |
| 1,175 | —NH— deformation |
| 1,360 | $CH_2$ bending in Si—$CH_2$—Si |
| 2,120 | Si—H stretch |
| 2,940-2,880 | $CH_2$ stretches |
| 3,377 | N—H stretch in Si—NH—Si |
| 3,473 | N—H stretch in Si—$NH_2$ |
| 3,700-3,400 | broad, solid phase, O—H stretch in Si—OH stretch |

Example 4

SiOC Low-k Film Formed by SOD Process Using TSP-Containing Polycarbosilazane

Figure 6:
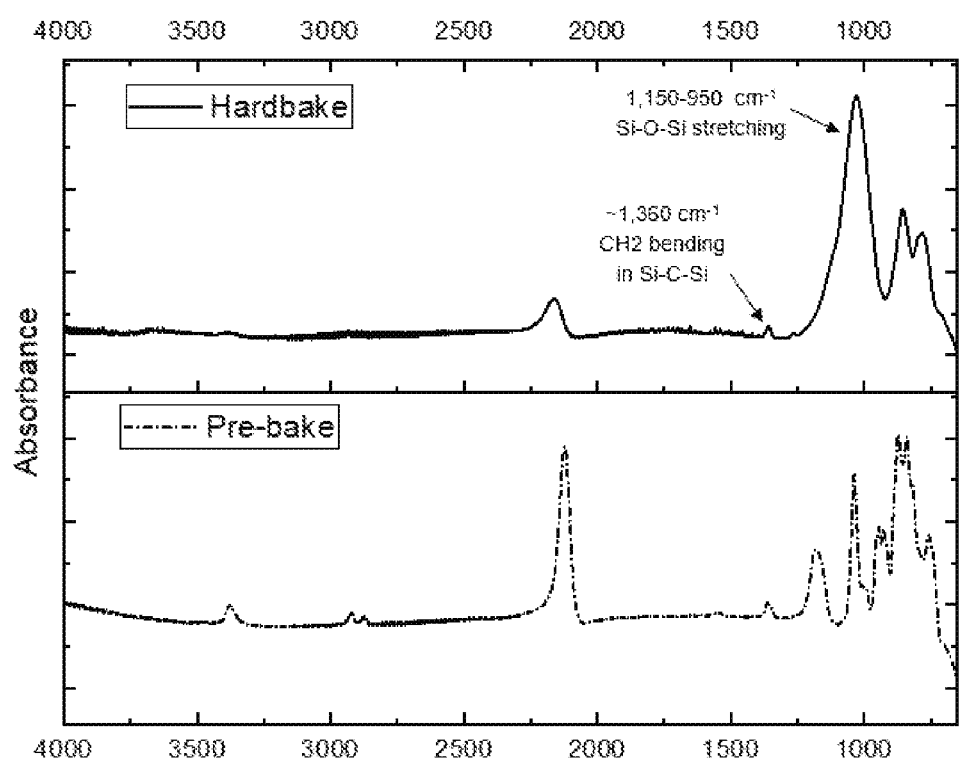
FIG. 6 is a FTIR spectrum comparison of the prebaked SOD film and the hardbaked SOD film.

A SOD film formed by using TSP-containing polycarbosilazane was obtained following a SOD process as described above in FIG. 1. The SOD film was then prebaked at 200° C. for 5 min under $N_2$ atmosphere and hardbaked in air for 30 min at 350° C. FIG. 6 is a FTIR spectrum comparison of the prebaked SOD film and the hardbaked SOD film. As shown, Si—O—Si peak at around 1,010 $cm^{-1}$ is growing and $CH_2$ at 1,360 $cm^{-1}$ remains as desired, N—H bonds at 3,377 $cm^{-1}$ is reduced but still exists, indicating part of N is replaced by O in the prebaked SOD film and the hardbaked SOD film contains SiOC and SiOCN. The thickness and the shrinkage of the hardbaked SOD formed film are listed in Table 1.

Although the subject matter described herein may be described in the context of illustrative implementations to process one or more computing application features/operations for a computing application having user-interactive components the subject matter is not limited to these particular embodiments. Rather, the techniques described herein may be applied to any suitable type of user-interactive component execution management methods, systems, platforms, and/or apparatus.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

While embodiments of this invention have been shown and described, modifications thereof may be made by one skilled in the art without departing from the spirit or teaching of this invention. The embodiments described herein are exemplary only and not limiting. Many variations and modifications of the composition and method are possible and within the scope of the invention. Accordingly, the scope of protection is not limited to the embodiments described herein, but is only limited by the claims which follow, the scope of which shall include all equivalents of the subject matter of the claims.

What is claimed is:

1. A reaction mixture for producing a film forming polycarbosilazane polymer or oligomer, the reaction mixture comprising carbosilanes and amines,
    wherein the carbosilanes contain at least two —$SiH_2$— moieties, either as terminal groups (—$SiH_2$R) or embedded in a carbosilane cyclic compound, wherein R is H, a $C_1$ to $C_6$ linear, branched, or cyclic alkyl-group, a $C_1$ to $C_6$ linear, branched, or cyclic alkenyl-group, or combination thereof, and
    wherein the reaction mixture is capable of forming the film forming polycarbosilazane polymer or oligomer,
    wherein the reaction mixture further comprises a polysilane that contains more than two —$SiH_2$R function groups, wherein R is H, a $C_1$ to $C_6$ linear, branched, or cyclic alkyl- group, a $C_1$ to $C_6$ linear, branched, or cyclic alkenyl-group, or a combination thereof.

2. The reaction mixture of claim 1, wherein the film forming polycarbosilazane polymer or oligomer has a backbone that comprises Si—N units, Si—N—$C_n$—N—Si units, Si—N—Si units or combinations thereof, wherein n≥1, wherein the backbone includes cross-linked Si—N units, Si—N—$C_n$—N—Si units, or Si—N—Si units, branched Si—N units, Si—N—$C_n$—N—Si units, or Si—N—Si units, or combinations thereof.

3. The reaction mixture of claim 1, wherein the carbosilane has the formula:

wherein $R^1$, $R^2$ are independently H, a $C_1$ to $C_6$ linear, branched or cyclic alkyl- group, a $C_1$ to $C_6$ linear, branched or cyclic alkenyl-group, or combination thereof; a=0 to 2; b=1 to 4; c=4-a; or

wherein $R^3$, $R^4$ are independently H, a $C_1$ to $C_6$ linear, branched or cyclic alkyl- group, a $C_1$ to $C_6$ linear, branched or cyclic alkenyl-group, or combination thereof; e=0 to 2; f=0 to 3; g=4-e; or $$[\text{scaffold}]\text{-}[\text{---}(CH_2)_m\text{---}SiH_2R^5]_n \quad (III)$$

wherein $R^5$ is H, a $C_1$ to $C_6$ linear, branched, or cyclic alkyl- group, a $C_1$ to $C_6$ linear, branched or cyclic alkenyl-group, or combination thereof; m=0 to 4; n=2 to 4; and the scaffold is a hydrocarbon scaffold; or $$R^6_x\text{-}1,3,5\text{-trisilacyclohexane} \quad (IV)$$

wherein $R^6$ is a $C_1$ to $C_6$ linear, branched or cyclic alkyl- or alkenyl-group; x=0 to 3.

4. The reaction mixture of claim 3, wherein the hydrocarbon scaffold is a hydrocarbon scaffold including a $C_3$ to $C_{10}$ cyclic hydrocarbon scaffold containing silyl- group, —NH group, —O— ether group.

5. The reaction mixture of claim 1, wherein the carbosilane contains Si—$C_n$—Si unit (n≥1) unit(s) or a 1,3,5-trisilacyclohexane (TSCH) backbone.

6. The reaction mixture of claim 1, wherein the carbosilane is selected from the group consisting of Si[—(CH$_2$)—SiH$_3$]$_4$, Si[—(CH$_2$)$_2$—SiH$_3$]$_4$, Si[—(CH$_2$)$_3$—SiH$_3$]$_4$, and Si[—(CH$_2$)$_4$—SiH$_3$]$_4$, $R^1$Si[—(CH$_2$)—SiH$_3$]$_3$, $R^1$Si[—(CH$_2$)$_2$—SiH$_3$]$_3$, $R^1$Si[—(CH$_2$)$_3$—SiH$_3$]$_3$, and $R^1$Si[—(CH$_2$)$_4$—SiH$_3$]$_3$, H$_3$Si—CH$_2$—SiH$_2$—CH$_2$—SiH$_3$ (bis(silylmethyl)silane), H$_3$Si—(CH$_2$)$_2$—SiH$_2$—(CH$_2$)$_2$—SiH$_3$ (bis(2-silylethyl)silane), H$_3$Si—(CH$_2$)$_3$—SiH$_2$—(CH$_2$)$_3$—SiH$_3$ (bis(3-silylpropyl)silane), and H$_3$Si—(CH$_2$)$_4$—SiH$_2$—(CH$_2$)$_4$—SiH$_3$ (bis(4-silylbutyl)silane), C[—SiH$_3$]$_4$(tetrasilylmethane), C[—(CH$_2$)—SiH$_3$]$_4$(2,2-bis(silylmethyl)propane-1,3-diyl)bis(silane)), C[—(CH$_2$)$_2$—SiH$_3$]$_4$(3,3-bis(2-silylethyl)pentane-1,5-diyl)bis(silane)), and C[—(CH$_2$)$_3$—SiH$_3$]$_4$(4,4-bis(3-silylpropyl)heptane-1,7-diyl)bis(silane)), $R^1$C[—SiH$_3$]$_3$, $R^1$C[—(CH$_2$)—SiH$_3$]$_3$, $R^1$C[—(CH$_2$)$_2$—SiH$_3$]$_3$, and $R^1$C[—(CH$_2$)$_3$—SiH$_3$]$_3$, H$_3$Si—CH$_2$—SiH$_3$ (bisilylmethane), H$_3$Si—(CH$_2$)$_5$—SiH$_3$ (1,5-disilylpentane)), and H$_3$Si—(CH$_2$)$_7$—SiH$_3$ (1,7-disilylheptane)), 1,3-disilylcyclopentane, 1,2-disilylcyclopentane, 1,4-disilylcyclohexane, 1,3-disilylcyclohexane, 1,2-disilylcyclohexane, 1,3,5-trisilylcyclohexane and 1,3,5-trisilylbenzene, 2-Me-TSCH, 2-Et-TSCH, 2-iPr-TSCH, 2-nPr-TSCH, 2-nBu-TSCH, 2-tBu-TSCH, 2-sBu-TSCH, 2-iBu-TSCH, 2,4-Me$_2$-TSCH, 2,4-Et$_2$-TSCH, 2,4-iPr$_2$-TSCH, 2,4-nPr$_2$-TSCH, 2,4-nBu$_2$-TSCH, 2,4-iBu$_2$-TSCH, 2,4-tBu$_2$-TSCH, 2,4-sBu$_2$-TSCH, 2,4,6-Me$_3$-TSCH, 2,4,6-Et$_3$-TSCH, 2,4,6-iPr$_3$-TSCH, 2,4,6-nPr$_3$-TSCH, 2,4,6-nBu$_3$-TSCH, 2,4,6-iBu$_3$-TSCH, 2,4,6-tBu$_3$-TSCH, 2,4,6-sBu$_3$-TSCH, and combinations thereof, wherein $R^1$ is H, a $C_1$-$C_6$ linear, branched, or cyclic alkyl-group, a $C_1$-$C_6$ linear, branched, or cyclic alkenyl-group, or combinations thereof.

7. The reaction mixture of claim 1, wherein the carbosilane is 1,3,5-trisilapentane (CAS No.: 5637-99-0) or 1,3,5-trisilacyclohexane (CAS No.: 291-27-0).

8. The reaction mixture of claim 1, wherein the amine is selected from one or more of ammonia, amidine, hydrazine, hydroxylamine, monoalkylamine, diamines including ethylene diamine, or polyamines, which polyamines contain at least two N—H bonds either on the same nitrogen atom or on separate nitrogen atoms.

9. The reaction mixture of claim 1, wherein the polysilane is selected from one or more of neopentasilane (Si(SiH$_3$)$_4$), n-tetrasilane (SiH$_3$(SiH$_2$)$_2$SiH$_3$), 2-silyl-tetrasilane ((SiH$_3$)$_2$SiHSiH$_2$SiH$_3$), trisilylamine (N(SiH$_3$)$_3$), or trisilyamine derivatives.

10. A method of forming a silicon and carbon containing film on a substrate, the method comprising the steps of:
producing a film forming polycarbosilazane polymer or oligomer by a polymerization of a reaction mixture of carbosilanes with amines;
forming a solution containing the film forming polycarbosilazane polymer or oligomer; and
contacting the solution with the substrate via a spin-on coating, spray coating, dip coating, or slit coating technique to form the silicon and carbon containing film,
wherein the carbosilanes contain at least two —SiH$_2$— moieties, either as terminal groups (—SiH$_2$R) or embedded in a carbosilane cyclic compound, wherein R is H, a $C_1$ to $C_6$ linear, branched, or cyclic alkyl-group, a $C_1$ to $C_6$ linear, branched, or cyclic alkenyl-group, or a combination thereof,
wherein the step of the producing the film forming polycarbosilazane polymer or oligomer comprises the step of adding a polysilane that contains more than two —SiH$_2$R function groups to the reaction mixture for enhancing the polymerization of the carbosilanes with amines, wherein R is H, a $C_1$ to $C_6$ linear, branched, or cyclic alkyl- group, a $C_1$ to $C_6$ linear, branched, or cyclic alkenyl-group, or a combination thereof.

11. The method of claim 10, further comprising the step of
pre-baking the silicon and carbon containing film under N$_2$ atmosphere at a temperature ranging from approximately 50° C. to 400° C.; and
subsequently hardbaking the silicon and carbon containing film by a heat-induced radical reaction or a UV-Vis photo induced radical reaction in an atmosphere of O$_2$, O$_3$, H$_2$O, H$_2$O$_2$, N$_2$O, or NO, air, compressed air, or combinations thereof at a temperature range of 200-1000° C. to convert the silicon and carbon containing film to a SiOC or SiOCN containing film.

12. The method of claim 10, wherein the film forming polycarbosilazane polymer or oligomer has a backbone that comprises Si—N units, Si—N—$C_n$—N—Si units, Si—N—Si units or combinations thereof, wherein n≥1, wherein the backbone includes cross-linked Si—N units, Si—N—$C_n$—N—Si units or Si—N—Si units, branched Si—N units, Si—N—$C_n$—N—Si units or Si—N—Si units, or combinations thereof.

13. The method of claim 10, wherein the carbosilane has the formula:

$$R^1_a Si[\text{---}(CH_2)_b\text{---}SiH_2R^2]_c \quad (I)$$

wherein $R^1$, $R^2$ are independently H, a $C_1$ to $C_6$ linear, branched or cyclic alkyl- group, a $C_1$ to $C_6$ linear, branched or cyclic alkenyl-group, or combination thereof; a=0 to 2; b=1 to 4; c=4-a; or $$R^3_e C[\text{---}(CH_2)_f\text{---}SiH_2R^4]_g \quad (II)$$

wherein $R^3$, $R^4$ are independently H, a $C_1$ to $C_6$ linear, branched or cyclic alkyl- group, a $C_1$ to $C_6$ linear, branched or cyclic alkenyl-group, or combination thereof; e=0 to 2; f=0 to 3; g=4-e; or $$[\text{scaffold}]\text{-}[\text{---}(CH_2)_m\text{---}SiH_2R^5]_n \quad (III)$$

wherein $R^5$ is H, a $C_1$ to $C_6$ linear, branched, or cyclic alkyl- group, a $C_1$ to $C_6$ linear, branched or cyclic alkenyl-group, or combination thereof; m=0 to 4; n=2 to 4; and the scaffold is a hydrocarbon scaffold; or $$R^6_x\text{-}1,3,5\text{-trisilacyclohexane} \quad (IV)$$

wherein $R^6$ is a $C_1$ to $C_6$ linear, branched or cyclic alkyl- or alkenyl-group; x=0 to 3.

14. The method of claim 10, wherein the carbosilane is selected from the group consisting of Si[—(CH$_2$)—SiH$_3$]$_4$, Si[—(CH$_2$)$_2$—SiH$_3$]$_4$, Si[—(CH$_2$)$_3$—SiH$_3$]$_4$, Si[—(CH$_2$)$_4$—SiH$_3$]$_4$, R$^1$Si[—(CH$_2$)—SiH$_3$]$_3$, R$^1$Si[—(CH$_2$)$_2$—SiH$_3$]$_3$, R$^1$Si[—(CH$_2$)$_3$—SiH$_3$]$_3$, R$^1$Si[—(CH$_2$)$_4$—SiH$_3$]$_3$, H$_3$Si—CH$_2$—SiH$_2$—CH$_2$—SiH$_3$ (bis(silylmethyl)silane), H$_3$Si—(CH$_2$)$_2$—SiH$_2$—(CH$_2$)$_2$—SiH$_3$ (bis(2-silylethyl)silane), H$_3$Si—(CH$_2$)$_3$—SiH$_2$—(CH$_2$)$_3$—SiH$_3$ (bis(3-silylpropyl)silane), and H$_3$Si—(CH$_2$)$_4$—SiH$_2$—(CH$_2$)$_4$—SiH$_3$ (bis(4-silylbutyl)silane), C[—SiH$_3$]$_4$(tetrasilylmethane), C[—(CH$_2$)—SiH$_3$]$_4$(2,2-bis(silylmethyl)propane-1,3-diyl) bis(silane)), C[—(CH$_2$)$_2$—SiH$_3$]$_4$(3,3-bis(2-silylethyl)pentane-1,5-diyl)bis(silane)), and C[—(CH$_2$)$_3$—SiH$_3$]$_4$(4,4-bis(3-silylpropyl)heptane-1,7-diyl)bis(silane)), R$^1$C[—SiH$_3$]$_3$, R$^1$C[—(CH$_2$)—SiH$_3$]$_3$, R$^1$C[—(CH$_2$)$_2$—SiH$_3$]$_3$, and R$^1$C[—(CH$_2$)$_3$—SiH$_3$]$_3$, H$_3$Si—CH$_2$—SiH$_3$ (bisilylmethane), H$_3$Si—(CH$_2$)$_5$—SiH$_3$ (1,5-disilylpentane), and H$_3$Si—(CH$_2$)$_7$—SiH$_3$ (1,7-disilylheptane), 1,3-disilylcyclopentane, 1,2-disilylcyclopentane, 1,4-disilylcyclohexane, 1,3-disilylcyclohexane, 1,2-disilylcyclohexane, 1,3,5-trisilylcyclohexane and 1,3,5-trisilylbenzene, 2-Me-TSCH, 2-Et-TSCH, 2-iPr-TSCH, 2-nPr-TSCH, 2-nBu-TSCH, 2-tBu-TSCH, 2-sBu-TSCH, 2-iBu-TSCH, 2,4-Me$_2$-TSCH, 2,4-Et$_2$-TSCH, 2,4-iPr$_2$-TSCH, 2,4-nPr$_2$-TSCH, 2,4-nBu$_2$-TSCH, 2,4-iBu$_2$-TSCH, 2,4-tBu$_2$-TSCH, 2,4-sBu$_2$-TSCH, 2,4,6-Me$_3$-TSCH, 2,4,6-Et$_3$-TSCH, 2,4,6-iPr$_3$-TSCH, 2,4,6-nPr$_3$-TSCH, 2,4,6-nBu$_3$-TSCH, 2,4,6-iBu$_3$-TSCH, 2,4,6-tBu$_3$-TSCH, 2,4,6-sBu$_3$-TSCH, and combinations thereof; and wherein $R^1$ is H, a $C_1$-$C_6$ linear, branched, or cyclic alkyl-group, a $C_1$-$C_6$ linear, branched, or cyclic alkenyl-group, or a combination thereof.

15. The method of claim 10, wherein the carbosilane is 1,3,5-trisilapentane (CAS No.: 5637-99-0) or 1,3,5-trisilacyclohexane (CAS No.: 291-27-0).

16. The method of 10, wherein the step of the producing the film forming polycarbosilazane polymer or oligomer comprises the step of adding a catalyst to the reaction mixture, wherein the film forming polycarbosilazane polymer or oligomer is produced by a polymerization of the reaction mixture through a catalytic dehydrocoupling (DHC) reaction.

17. The method of claim 16, wherein the catalyst is NH$_4$Cl.

18. The method of 10, wherein the polysilane is selected from one or more of neopentasilane (or 2,2-disilyltrisilane) (Si(SiH$_3$)$_4$), n-tetrasilane (SiH$_3$(SiH$_2$)$_2$SiH$_3$), 2-silyl-tetrasilane ((SiH$_3$)$_2$SiHSiH$_2$SiH$_3$), trisilylamine (N(SiH$_3$)$_3$), alkylamino-substituted trisilylamines or oligomers of trisilylamines.

19. The method of claim 18, wherein the film forming polycarbosilazane polymer or oligomer is produced by the polymerization of the carbosilanes with amines through the catalytic dehydrocoupling (DHC) reaction selected from one or more of
i) two carbosilanes with two amines, wherein one of the two carbosilanes contains the at least two —SiH$_2$— moieties, either as the terminal groups (—SiH$_2$R) or embedded in the carbosilane cyclic compound;
ii) two carbosilanes with two amines, wherein one of the two amines contains more than two N—H bonds; and
iii) more than two carbosilanes with more than two amines,
wherein R is H, a $C_1$ to $C_6$ linear, branched, or cyclic alkyl-group, a $C_1$ to $C_6$ linear, branched, or cyclic alkenyl-group, or a combination thereof.

20. A silicon and carbon containing film forming composition comprising:
a film forming polycarbosilazane polymer or oligomer that has a backbone comprising Si—N units, Si—N—C$_n$—N—Si units, Si—N—Si or combinations thereof, wherein n≥1,
wherein the backbone includes cross-linked Si—N units, Si—N—C$_n$—N—Si units or Si—N—Si units, branched Si—N—Si units, Si—N—C$_n$—N—Si units or Si—N—Si units, or combinations thereof
wherein the film forming polycarbosilazane polymer or oligomer is obtained from a reaction mixture comprising carbosilanes and amines,
wherein the carbosilanes contain at least two —SiH$_2$— moieties, either as terminal groups (—SiH$_2$R) or embedded in a carbosilane cyclic compound, wherein R is H, a $C_1$ to $C_6$ linear, branched, or cyclic alkyl-group, a $C_1$ to $C_6$ linear, branched, or cyclic alkenyl-group, or combination thereof, and
wherein the reaction mixture further comprises a polysilane that contains more than two —SiH$_2$R function groups, wherein R is H, a $C_1$ to $C_6$ linear, branched, or cyclic alky- group, a $C_1$ to $C_6$ linear, branched, or cyclic alkenyl-group, or a combination thereof.

* * * * *